(12) United States Patent
Kerfoot

(10) Patent No.: US 8,678,354 B2
(45) Date of Patent: Mar. 25, 2014

(54) NANO-BUBBLE GENERATOR AND TREATMENTS

(76) Inventor: William B Kerfoot, Falmouth, MA (US)

(*) Notice: Subject to any disclaimer, the term of this patent is extended or adjusted under 35 U.S.C. 154(b) by 467 days.

(21) Appl. No.: 12/753,248

(22) Filed: Apr. 2, 2010

(65) Prior Publication Data

US 2011/0241230 A1    Oct. 6, 2011

(51) Int. Cl.
*B01F 3/04* (2006.01)
(52) U.S. Cl.
USPC .............. 261/37; 261/76; 261/96; 261/97; 261/102
(58) Field of Classification Search
USPC .......... 261/37, 76, 77, 94, 96, 97, 100, 102
See application file for complete search history.

(56) References Cited

U.S. PATENT DOCUMENTS

| | | | | |
|---|---|---|---|---|
| 2,825,413 A * | 3/1958 | Williams | ............... | 169/15 |
| 3,409,274 A * | 11/1968 | Lawton | ............... | 366/144 |
| 4,743,405 A * | 5/1988 | Durao et al. | ............... | 261/76 |
| 4,761,077 A * | 8/1988 | Werner | ............... | 366/165.1 |
| 4,838,434 A * | 6/1989 | Miller et al. | ............... | 209/164 |
| 4,936,552 A * | 6/1990 | Rothrock | ............... | 261/76 |
| 5,004,484 A * | 4/1991 | Stirling et al. | ............... | 95/263 |
| 5,240,650 A * | 8/1993 | Wiederhold et al. | ............... | 261/76 |
| 5,520,856 A * | 5/1996 | Garrett et al. | ............... | 261/76 |
| 5,935,490 A * | 8/1999 | Archbold et al. | ............... | 261/76 |
| 6,103,123 A * | 8/2000 | Gantzer | ............... | 210/605 |
| 6,237,897 B1 * | 5/2001 | Marina | ............... | 261/64.1 |
| 6,913,251 B2 * | 7/2005 | Kerfoot | ............... | 261/77 |
| 2004/0213705 A1 | 10/2004 | Blencoe et al. | | |
| 2005/0194148 A1 | 9/2005 | Kerfoot | | |
| 2008/0047905 A1 | 2/2008 | Kerfoot | | |
| 2008/0237141 A1 | 10/2008 | Kerfoot | | |

OTHER PUBLICATIONS

PCT Notification of International Search Report & Written Opinion, May 2011.

* cited by examiner

*Primary Examiner* — Charles Bushey
(74) *Attorney, Agent, or Firm* — Fish & Richardson P.C.

(57) ABSTRACT

Bubble generator devices to produce a fluid stream of bubbles are described. Apparatuses that include any of the described bubble generator devices to treat waste and/or frac-water are also described.

26 Claims, 19 Drawing Sheets

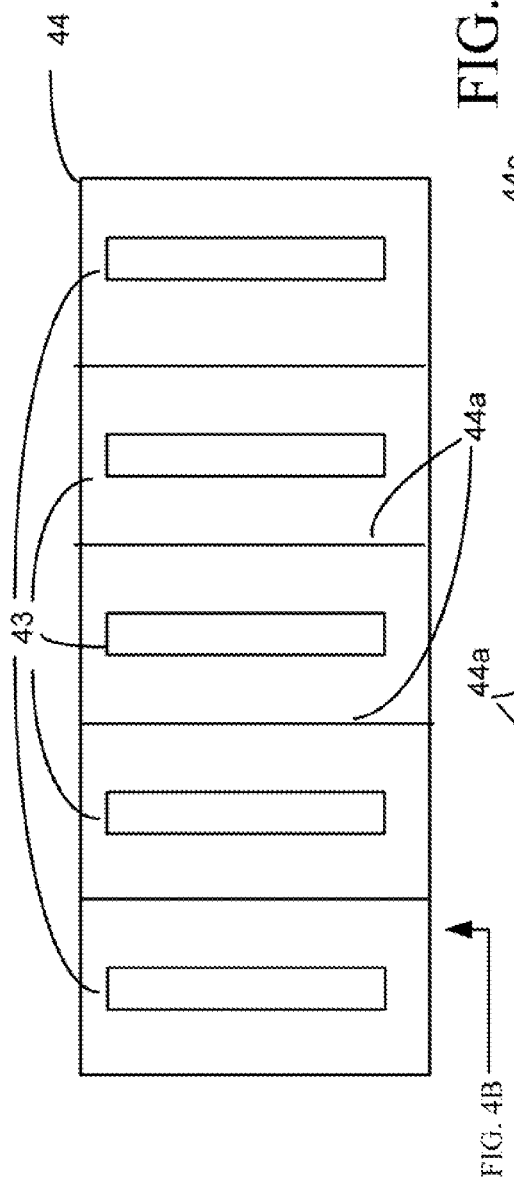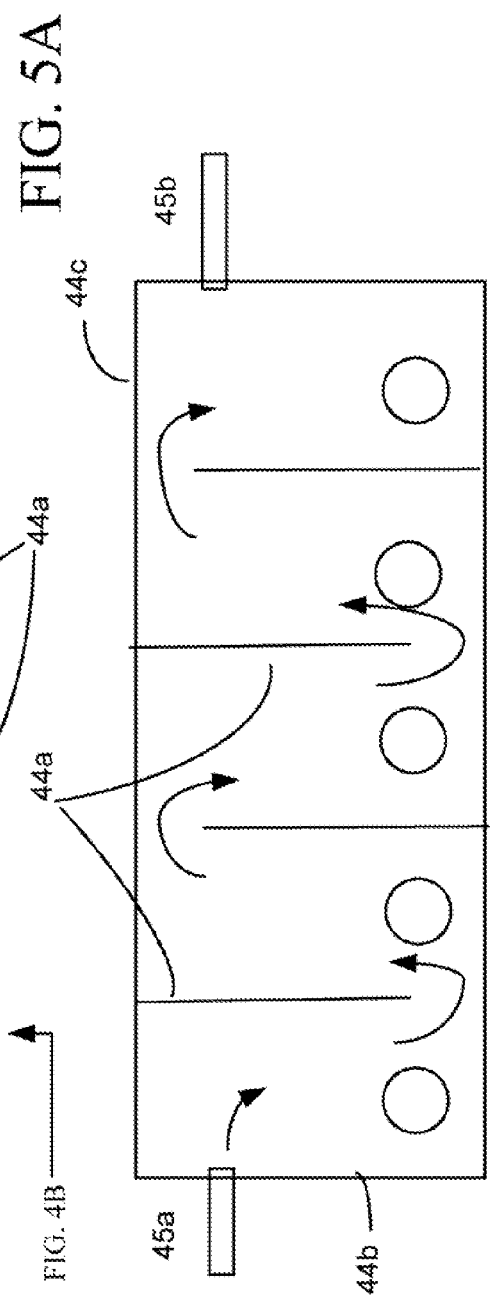
FIG. 5A
FIG. 5B

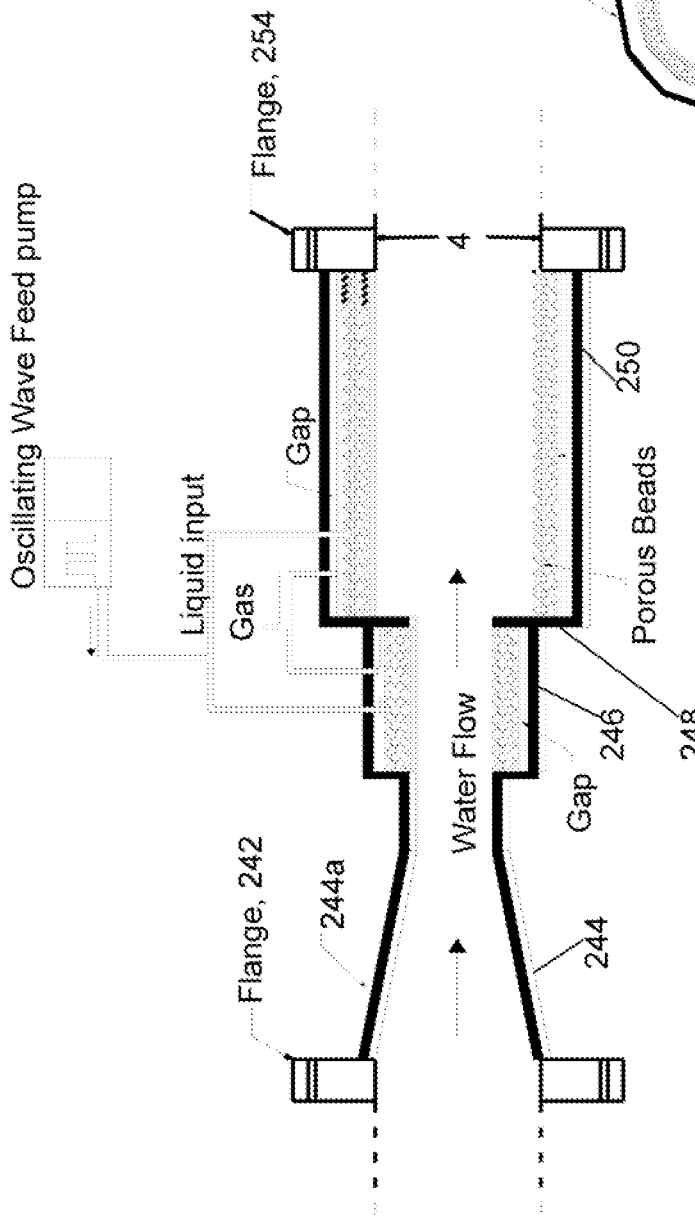
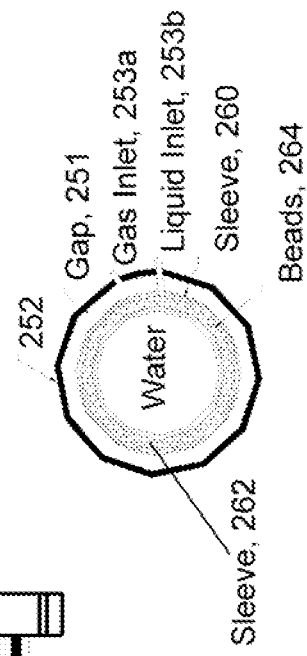
FIG. 8A
FIG. 8B

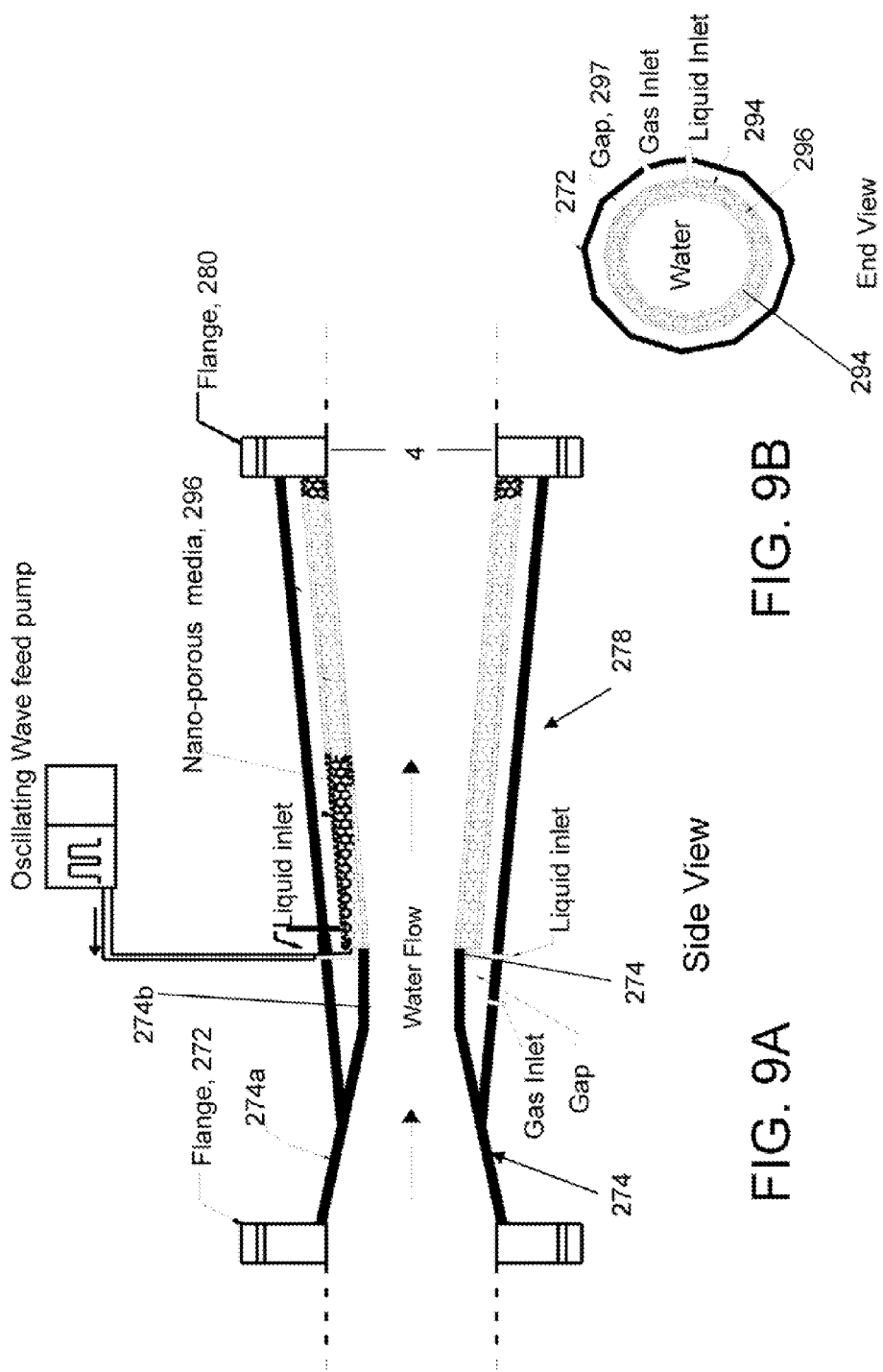

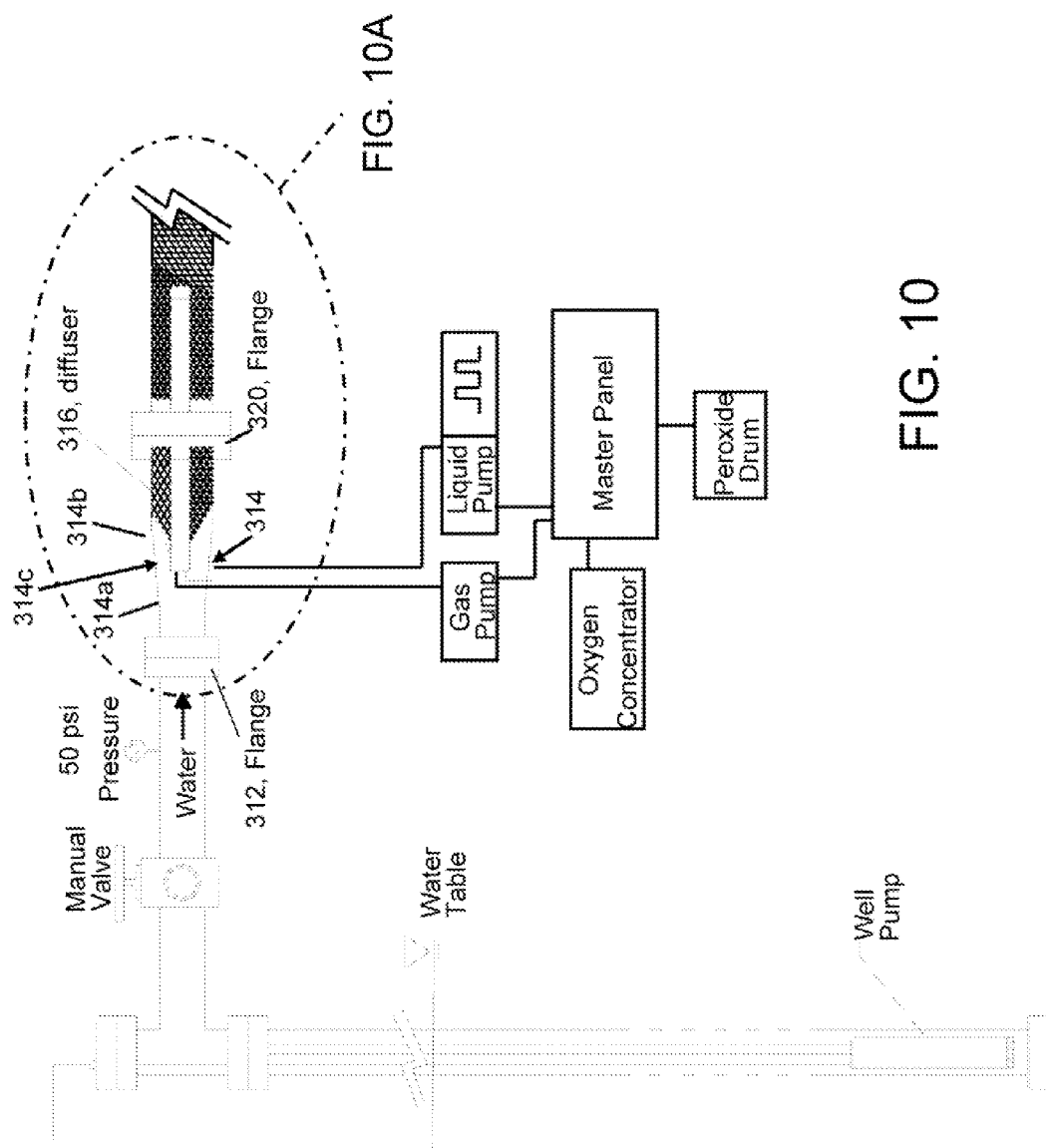

US 8,678,354 B2

NANO-BUBBLE GENERATOR AND TREATMENTS

BACKGROUND

This invention relates to techniques to generate sub-micron bubbles for example in use in treatment of contaminants in waste water frac-water and so forth, as well as other uses.

Waste water is a common form of water having contaminants. Waste water can arise in municipal waste as well as other types of waste, e.g., run off from farms, refineries, industrial processes, domestic applications, etc.

Frac-water on the other hand is principally associated with the oil and gas industry. The oil and gas industry has developed techniques to recover hydrocarbons such as oil and natural gas from shale deposits by so called "horizontal fracturing." In horizontal fracturing, a stream of water is injected under pressure into wells disposed through shale deposits. Once fracturing is completed, the water (i.e., "frac-water") is contaminated with petroleum residue and is returned to holding tanks for decontamination.

The underlying return water layer is contaminated, e.g., by high concentrations of alkanes, and may be somewhat saline. Generally, the underlying water contains from 1 to 10 parts per thousand chlorides (10,000-100,000 ppm) after usage. Other ranges are of course possible based on environmental conditions. Normally, drinking water standards generally require levels less than 250 ppm chloride, in order to have proper viscosity for discharge, whereas river discharge standards require generally levels less than 2,000 ppm, although this standard can vary.

SUMMARY

Nano-bubble ozone can be useful with initial injection of fracture water as well as treatment of contaminated return water. Biocides are commonly employed because the watery fluids used to fracture rocks heat up when they are pumped into the ground at high speed, causing bacteria and mold to multiply. The biocidal capacity of coated nano-bubble ozone may have value in reducing bacterial fouling of return gas flow from fracturing of shale. The buildup of black bacterial goop following water fracturing of shale deposits may interfere with gas conductivity. Nano-bubble ozone has bactericidal capacity greater than dissolved ozone. Peroxide-coated nano-bubble ozone could be generated at the fracture well site and injected as part of the fracture source water mixture or introduced separately through existing venturi pipes as a liquid stream or produced with peroxide and ozone gas flow with modified venturi injectors proposed herein.

According to an aspect of the invention, a generator device to produce a fluid stream comprising bubbles includes a casing having an inlet port and an outlet port through which water comprising contaminates flows with the casing having a region that constricts fluid flow between the inlet port and the outlet port, a pair of feed ports that receive fluids supported by the casing and a pair of microporous sleeve members disposed in an longitudinal relationship with the outer casing, and spaced from an inner surface of the outer casing, the pair of microporous sleeve members containing microporous media disposed within a space defined between the sleeve members, with at least one of the pair of feed ports that receive the fluid coupled to deliver the fluid through the microporous media.

The bubble generator has the casing as generally conical in shape and the pair of microporous sleeve members form a conical shape that generally follows the conical shape of the casing member. The bubble generator has the casing including an inner first member that receives an inflow, the first member having a conical region, a neck-down region to constrict the inflow, and a cylindrical region and a second member comprising a conical member confining the pair of microporous sleeve members and connected to the conical region of the first member. The bubble generator has the casing as generally cylindrical in shape and the pair of microporous sleeve members form a cylindrical shape that generally follows the cylindrical shape of the casing member. The bubble generator has the casing including a first member that receives an inflow, the first member having a conical region, a neck-down region to constrict the inflow, and a cylindrical region, a first cylindrical member confining the pair of microporous sleeve members and a second cylindrical member connected to the first cylindrical member confining another pair of microporous sleeve members. The bubble generator has the filter media comprised of glass beads. The bubble generator has porosity of the sidewalls of the sleeve members less than 0.5 microns.

According to an additional aspect of the invention, an arrangement includes a bubble generator device to produce a fluid stream comprising nano bubbles, the bubble generator including a outer casing member having an inlet port and an outlet port and a cap portion that receives at least one fluid line, a diffuser, disposed in the outer casing member, the diffuser have porous sidewalls, the diffuser disposed in an axial relationship with inner surfaces of the outer casing member, the diffuser having an inlet coupled to the fluid line, and a first vessel coupled to the bubble generator device, the first vessel having a first inlet that is coupled via a fluid line to the outlet of the casing member, a first outlet, a second inlet to receive frac-water, and a second outlet. The apparatus also includes a pump coupled to the first outlet of the first vessel to receive water from the first vessel and to pump the received water into the inlet port of the outer casing member and a second vessel that receives treated frac-water from the first vessel, the second vessel fed by a stream of carbon dioxide to precipitate out alkaline earth metals present in the treated frac-water.

The arrangement has the second vessel including a diffuser to receive the carbon dioxide. The arrangement has the first vessel including a diffuser to receive the carbon dioxide. The arrangement includes apparatus for feeding carbon dioxide to the second vessel, the carbon dioxide generated from reactions involving the water in the first vessel. The arrangement includes apparatus for feeding carbon dioxide to the second vessel from a source of carbon dioxide and for feeding carbon dioxide generated from reactions involving the water in the first vessel. The arrangement includes a filter to control bubble sized in the first vessel. The wherein a ratio of a flow rate of water between the first vessel and the outer casing member to flow rates of inflow to the second vessel from the source of contaminated water and outflow from the second vessel in a range of 1 to about 30.

According to an additional aspect of the invention, an apparatus includes a conical shaped pipe having a narrow cross-section at a first end and having a wider cross-section as a second end, a cylindrical pipe having a cross-section substantially equal to that cross-section of the second of the conical pipe and joined to that second end of the conical pipe, a diffuser disposed though an interior region defined by at least a portion of the conical and cylindrical pipes and a pair of inlets to receive a pair of fluids.

According to an additional aspect of the invention, an apparatus includes a nano-bubble generator, a vessel including a first container to confine a water steam, the container having a top that supports an inlet that receives water stream to be treated; and a second container, disposed within the first container having a cross-section small than the cross-section of the first container, the second container having a bottom member that is perforated, the second container having an inlet to receive a fluid stream comprising nano-bubbles from the nano-bubble generator.

According to an additional aspect of the invention, an arrangement includes a generator device to produce a fluid stream comprising bubbles, the generator device including a casing having an inlet port and an outlet port through which water comprising contaminates flows with the casing having a region that constricts fluid flow between the inlet port and the outlet port, a pair of feed ports that receive fluids supported by the casing, a pair of microporous sleeve members disposed in an longitudinal relationship with the outer casing, and spaced from an inner surface of the outer casing, the pair of microporous sleeve members containing microporous media disposed within a space defined between the sleeve members, with at least one of the pair of feed ports that receive the fluid coupled to deliver the fluid through the microporous media; and a vessel that receives treated frac-water from the vessel fed by a stream of carbon dioxide to precipitate out alkaline earth metals present in the treated frac-water.

The arrangement has the vessel as a first vessel and the arrangement further includes a second vessel coupled to the bubble generator device, the second vessel having a first inlet that is coupled via a fluid line to the outlet of the casing of the bubble generator device, a first outlet, a second inlet to receive frac-water, and a second outlet, a pump coupled to the first outlet of the second vessel to receive water from the second vessel and to pump the received water into the inlet port of the casing of the bubble generator device.

The arrangement of includes apparatus for feeding carbon dioxide to the second vessel from a source of carbon dioxide and for feeding carbon dioxide generated from reactions involving the water in the first vessel. The arrangement has the casing as generally conical in shape and the pair of microporous sleeve members form a conical shape that generally follows the conical shape of the casing member. The arrangement has the casing is generally cylindrical in shape and the pair of microporous sleeve members form a cylindrical shape that generally follows the cylindrical shape of the casing member.

The arrangements using the nano-bubble generators can be placed in-line (in-pipe), side-line, or at the front of baffle tank arrangements. The arrangements can operate on reverse venturi, venturi, loop, or side-by stream loop arrangements. The arrangements can generate sub-micron bubbles, uncoated or coated with peroxides or other reactant enhancers. The mounting of in-line systems before high pressure pumps at wellheads or loop arrangements results in substantial increase in reactive efficiency (two- to five-fold) of the low-micron to sub-micron (nano) bubbles.

The arrangements generate nano-bubbles 0.1 to 10 micron size (100 to 10,000 nanometers). Thin film reactivity provides high oxidation potential (108 m-1 sec-1), minimizes volume of peroxide needed and avoids coalescing of bubbles (negative charge repels). The loop arrangement concentrates bubble density, and elevated pressure enhances rate of reactivity (gaseous-induced reactions), opposed to dissolved aqueous reactions.

The nano-bubble generators have applications in bacterial disinfection, volatile organic compound (VOC) removal and pharmaceutical and endocrine disruptor removal over traditional dissolved molecular ozone use. The generators offer advances in water and wastewater treatment, hazardous VOC treatment, particularly 1,4 dioxane and chloroethene removal, and alkane treatment of fracture water or secondary recovery process water which aids in recycling or reuse of the water.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 5A-B and 6A-B are diagrams of a baffled treatment tank.

FIGS. 8A and 8B are side and end views respectively of a cylindrical nano-bubble generator.

FIGS. 9A and 9B are side and end views respectively of a conical nano-bubble generator.

FIG. 10 is a schematic view of an inline treatment apparatus including an inline bubble generator.

DETAILED DESCRIPTION

Figure 1:
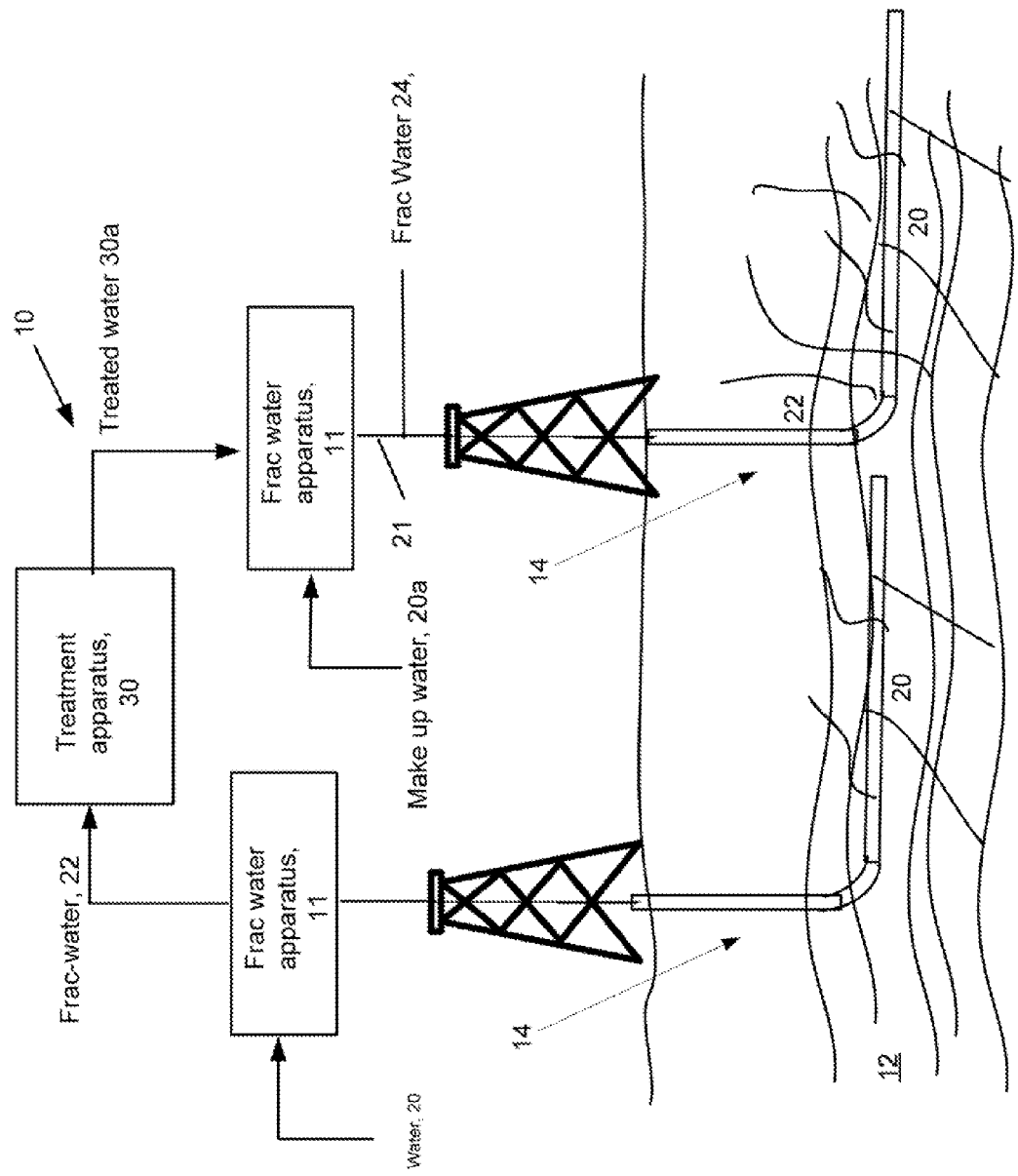
FIG. 1 is a block diagram of an arrangement for horizontal fracturing with treated water.

Referring to FIG. 1 an arrangement 10 for recovery of hydrocarbons in earth deposits, such as shale 12 is shown. The arrangement 10 can be used in other deposits that have hydrocarbons, such as tar sands and so forth. Tar sands are often used to refer to bituminous sands, oil sands or extra heavy oil deposits. Tar sands include sand or/and clay, water, and extra heavy crude oil. The arrangement 10 includes the injection of water under pressure. Wells 14 are drilled into, e.g., shale and are diverted horizontally and then holed by special down-well tools to allow fluid to fracture the shale horizontally. The fluid, e.g., water is injected with beads (propagent) to hold the channels open after fracturing. A single well normally yields return fluids water and product of up to 60% of injected water or more. The arrangement 10 includes conventional horizontal well fracture apparatus 11, and novel treatment apparatuses (any of those shown in FIG. 3A to FIG. 11. Other fracturing techniques as discussed below could be used.

The arrangement 10 includes a plurality of horizontal wells 14, as shown. A first one of the horizontal wells 14 is used to deliver a fluid, e.g., water 20 under pressure to shale 12 that lies below the surface. For this first one, the water is typically water that comes from, e.g., a river and so forth. The water 20 under pressure is used to fracture the underlying shale formations causing fracture pathways in the shale to allow for extraction of hydrocarbon product that is trapped in the shale. If desired, the ozone nano-bubble generators can also introduce the coated ozone into the river makeup water on first introduction as a biocide (bacterial inhibitor). The same borehole is used to recover e.g., 60% of the injected water which rebounds under pressure, (e.g., the water is injected under pressure sufficient to lift the soil weight above it (fracturing)). When the source pressure is removed, the formation weight collapses on the fracture, pushing the water back up the pipe under considerable pressure. The original fracture well 14 is used to recover the water 22 that was introduced under pressure. This water 22 is commonly referred to as fracture water or "frac-water." The frac-water 22 is contaminated with, e.g., homogenized, hydrocarbon product, as well as other products. The water 20 is supplied from a supply (not shown) and is pumped under very high pressures into the formation via a compressor. Often many thousands if not millions of gallons of water are introduced to fracture the underlying shale.

The arrangement 10 includes at least a second other horizontal well 14, as shown. The second horizontal well 14 is used to deliver a fluid, e.g., water 21, comprised of "make up" water 20a (make-up referring to the volume of water that was not recovered from the first well 14 and that needs to be added to the second well) under pressure that is combined with so called "treated water 30a" that comes from treatment apparatus 30, to the shale 12 that lies below the surface. The water 21 under pressure is used to fracture the underlying shale formations causing fracture pathways in the shale to allow for extraction of hydrocarbon product that is trapped in the shale, as before. However, the water 21 because it includes the treated water 30a has an elevated oxidation/reduction potential (ORP) that can be used to advantage to dissolve paraffin that can inhibit release of hydrocarbon product. The same borehole in the second well 14 is used to recover again over 60% of the injected fluid, e.g., water, (and hydrocarbon product) which rebounds under pressure. The frac-water 24 from the second well 14 is again contaminated with hydrocarbon product, which would in general be a higher percentage of hydrocarbon product than the first well that did not use the treated water 30a with the elevated ORP, as well as other products. It can be treated and discharged or treated and re-injected into a subsequent well.

In addition, the arrangement 30 with a single one of the wells 14 can be used for treatment (without re-injection) but rather discharge, as also discussed below.

Figure 2:
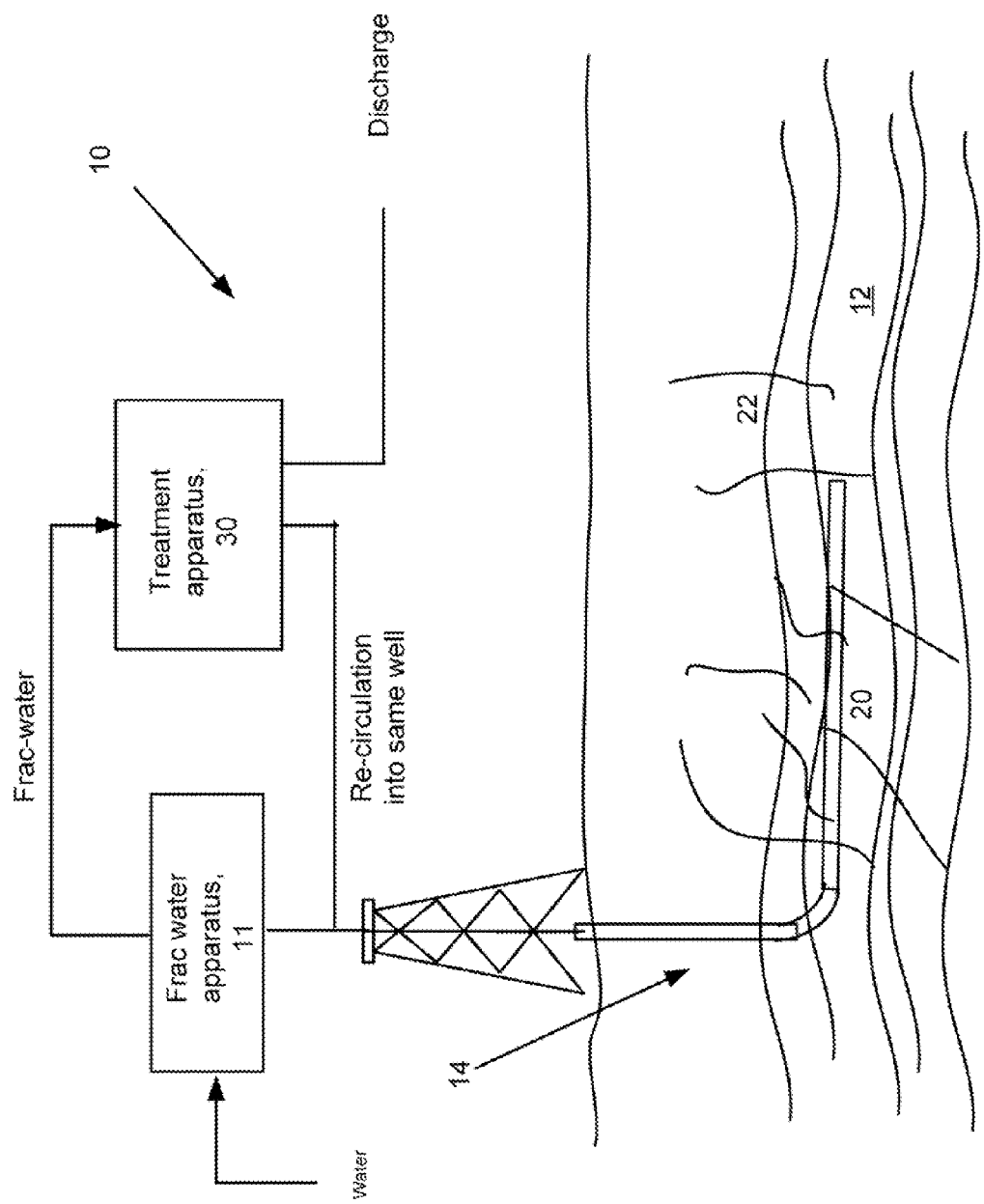
FIG. 2 is a block diagram of an alternative arrangement for horizontal fracturing and/or discharge of treated water.

FIG. 2 shows an alternative example that has the treatment apparatus re-injecting water into the same well or for discharge as discussed above.

Moreover, other techniques are possible. For instance, rather than using frac-water, water can be treated to provide, e.g., alkanes, and thereafter that water can be treated with ozone or ozone/hydrogen peroxide to provide water with the elevated ORP. Other techniques are possible, such as coating micro to Nano-bubbles with persulfate, modified Fenton's Reagent, sodium percarbonate, or other surfaces which would enhance formation of hydroxyl radicals. In addition, other techniques can be used to increase the ORP reactivity of the frac-water.

Figure 3A:
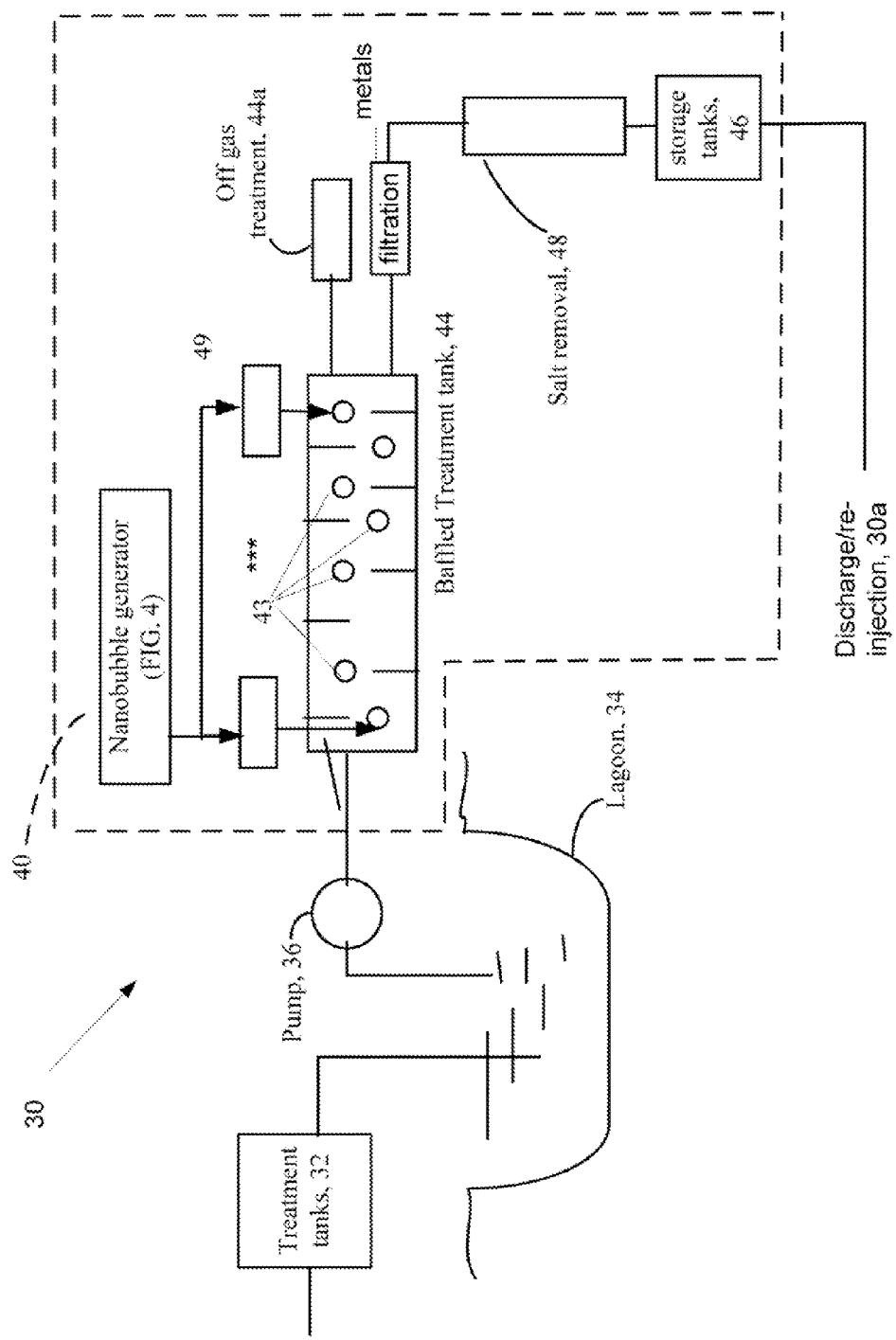
FIGS. 3A-3C are block diagrams of water treatment apparatus arrangements.
Figure 3B:
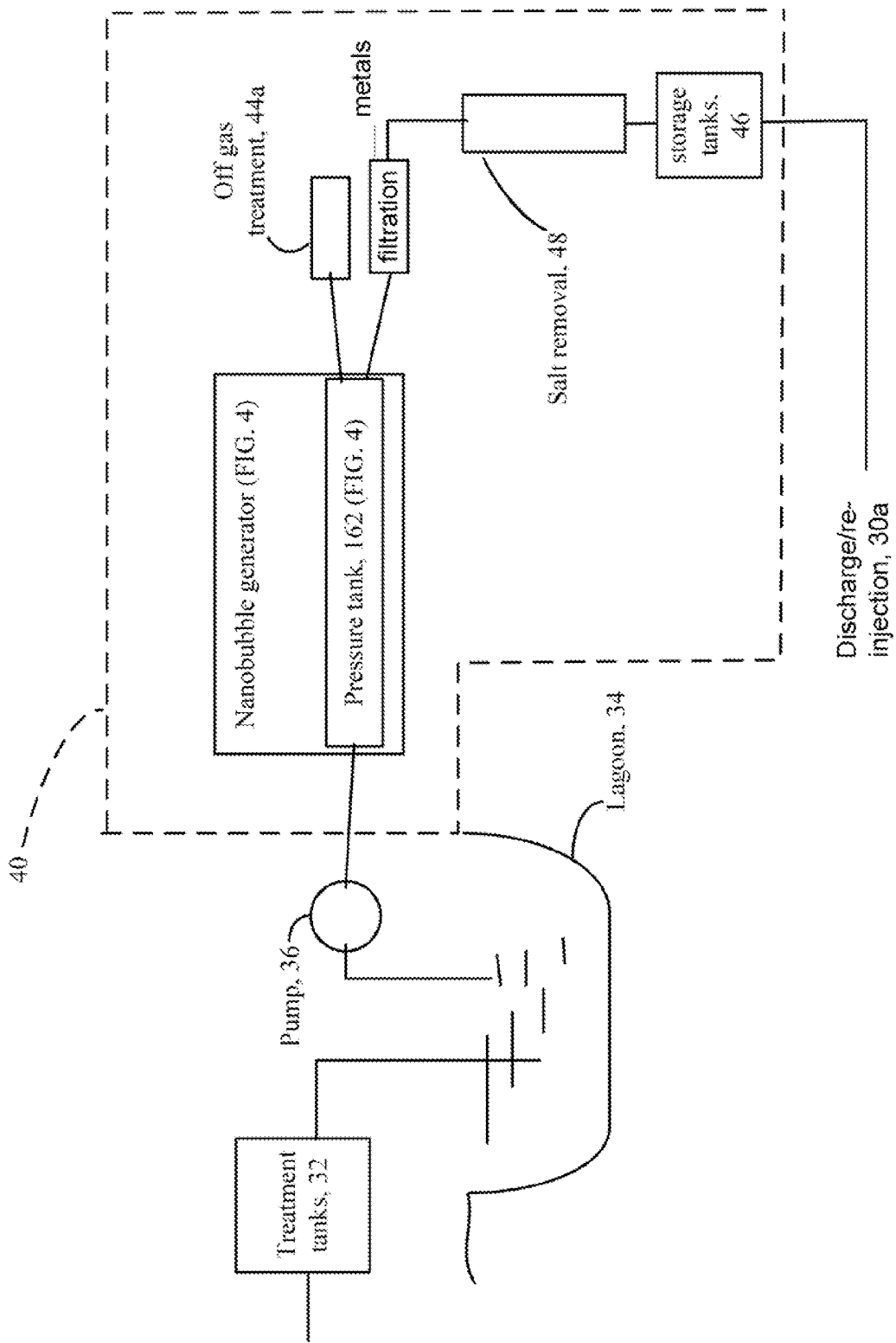
Figure 3C:
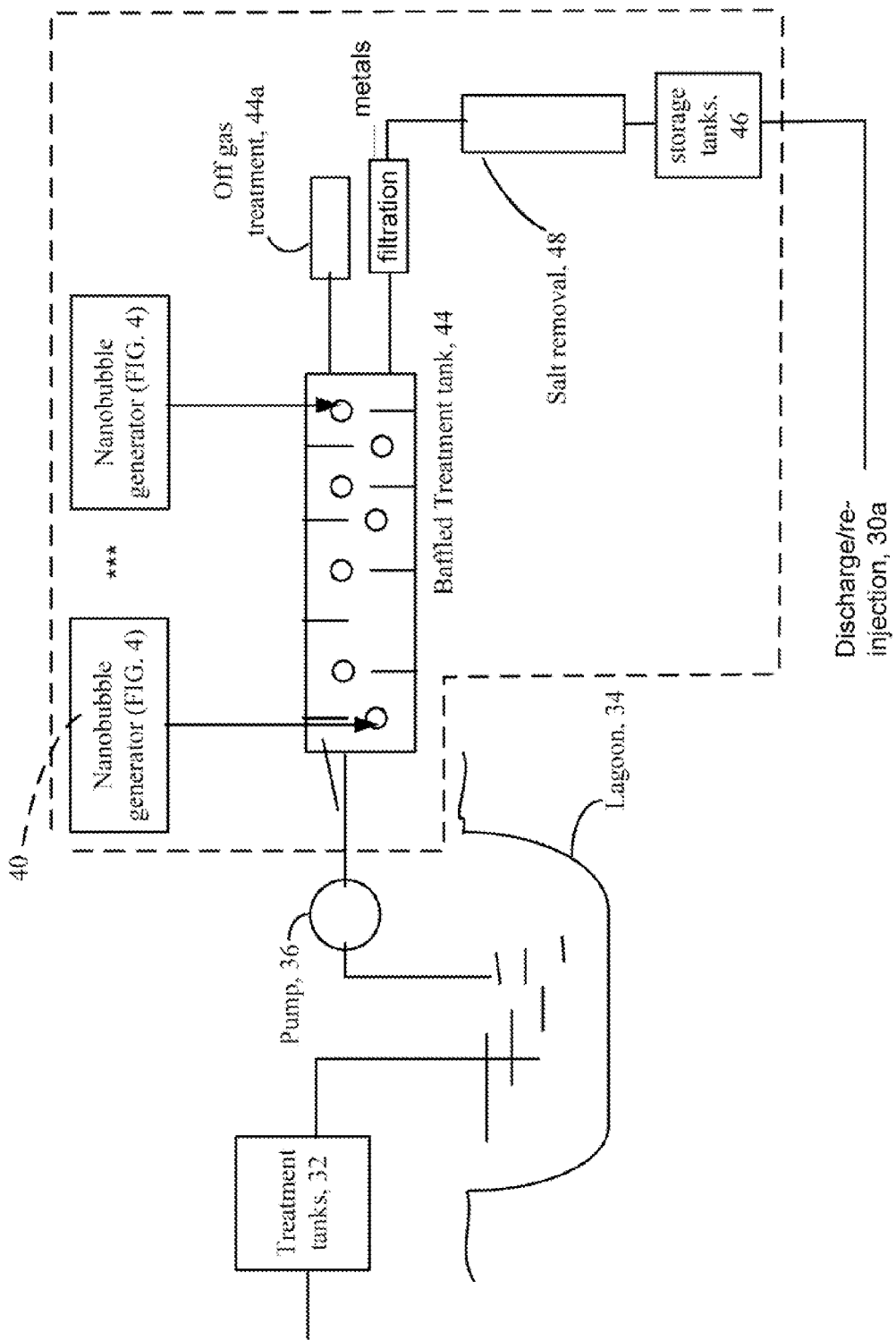
Figure 14:
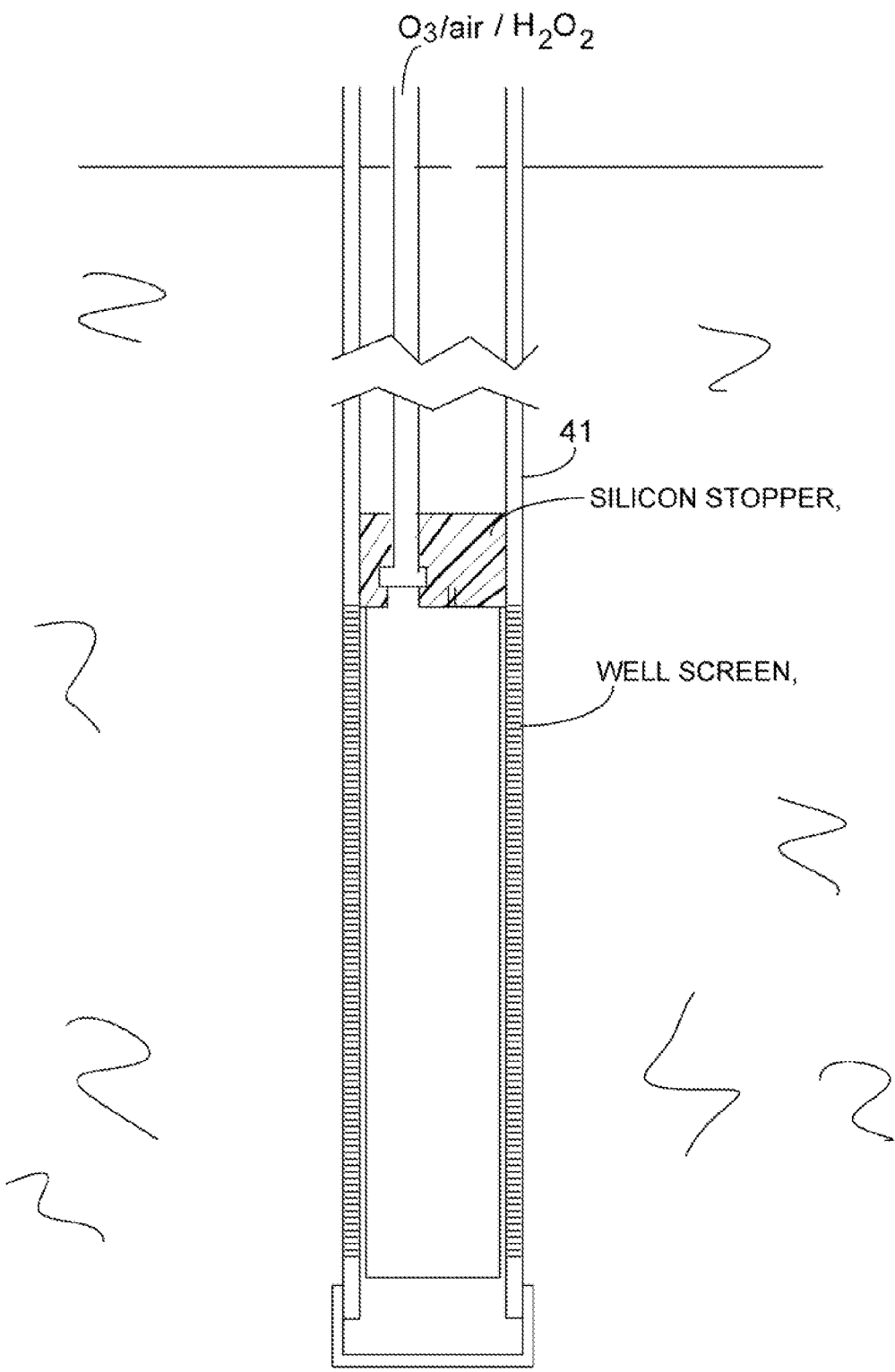
FIG. 14 depicts an exemplary arrangement for sparging.

Referring now to FIGS. 3A-3C, treatment systems 30 for treatment of, e.g., "frac-water," as for applications in FIGS. 1 and 2 or sparging for contaminants as in FIG. 14 or treatment of waste water, e.g., removal of pharmaceuticals or for removal of organic wastes as well as other waste water treatments are shown. In some embodiments, the system 30 includes product separation treatment tanks 32, a settling lagoon 34 (or storage tanks), and a pump 36. The pump 36 transfers liquid from the settling lagoon 34 or other storage tanks to a chemical oxidation treatment system 40 for removing VOCs (volatile organic compounds) and TOC (total organic carbon), heavy metals, (e.g., Fe, Mn, etc.) and to a desalination unit 48 for salt removal.

Using frac-water as an example, the extracted frac-water 22 from the formation comprises "product", e.g., light non-aqueous phase liquids (LNAPL) and an underlying water product. The frac-water 22 is allowed to separate into the LNAPL and underlying water in the product separator and initial storage tanks 32 where substantial LNAPL product, e.g., are skimmed off of the surface of the recovered frac-water. This product is typically sold and used for various purposes. An exemplary analysis of a typical product is:

Product: Petroleum Hydrocarbons C8 to C30 (Similar to aviation/jet fuel)
Contains:

|   | | |
|---|---|---|
|   | Toluene | .019 |
|   | Xylenes | .045 |
| (est.) | Benzene | .009 |
| (est.) | Ethylbenzene | .007 |
| (est.) | Trimethylbenzene | .018 |
| (est.) | Acetone | .005 |

(est. from aqueous fraction by proportion)
TPH 70% alkanes C6 to C30 15% VOCs (BTEX, etc.)
No PAHs found

| | |
|---|---|
| SVOCs | ND (None detected) |
| Alkanes/Alkenes | |
| Petroleum Hydrocarbons GC-GRO | |
| Gasoline-range organics GC-DRO | 380,000 µg/L |
| Diesel-range organics Metals (in aqueous) | 182,000 µg/L |
| Copper, total | .041 mg/L |
| Iron, total | 11 mg/L |
| Lead, total | ND |
| Manganese, total | 1.84 mg/L |
| Zinc, total | .072 mg/L |

The liquid that remains is generally an emulsion including water and other hydrocarbon products. An exemplary analysis of a typical aqueous fraction, which was part of the frac-water from the product analysis above, is:

| Aqueous Fraction: | |
|---|---|
| VOCs | (µg/L) |
| Benzene | 370 |
| Toluene | 1800 |
| Ethylbenzene | 230 |
| p/m Xylene | 2600 |
| o Xylene | 540 |
| Acetone | 1100 |
| n-Butylbenzene | 140 |
| sec-Butylbenzene | 41 |
| Isopropylbenzene | 63 |
| p-Isopropyltoluene | 84 |
| n-Propylbenzene | 98 |
| 1,3,5 Trimethylbenzene | 920 |
| 1,2,4 Trimethylbenzene | 1000 |
| SVOCs | ND (Non-detect) |
| Alkanes/Alkenes | |
| Petroleum Hydrocarbons GC-GRO | |
| Gasoline-range organics GC-DRO | 380,000 µg/L |
| Diesel-range organics Metals (in aqueous) | 182,000 µg/L |
| Copper, total | .041 mg/L |
| Iron, total | 11 mg/L |
| Lead, total | ND |

| | |
|---|---|
| Manganese, total | 1.84 mg/L |
| Zinc, total | .072 mg/L |

This emulsion is fed to the settling lagoon 34 (or a large tank) where semi-volatile organics and metals particulates settle out. From the settling lagoon 34, the aqueous fraction still comprises organic hydrocarbons that are in an emulsion or suspension. The liquid from the settling lagoon 34 is fed to a pump 36 that pumps the liquid into the oxidation treatment system 40.

Figure 4:
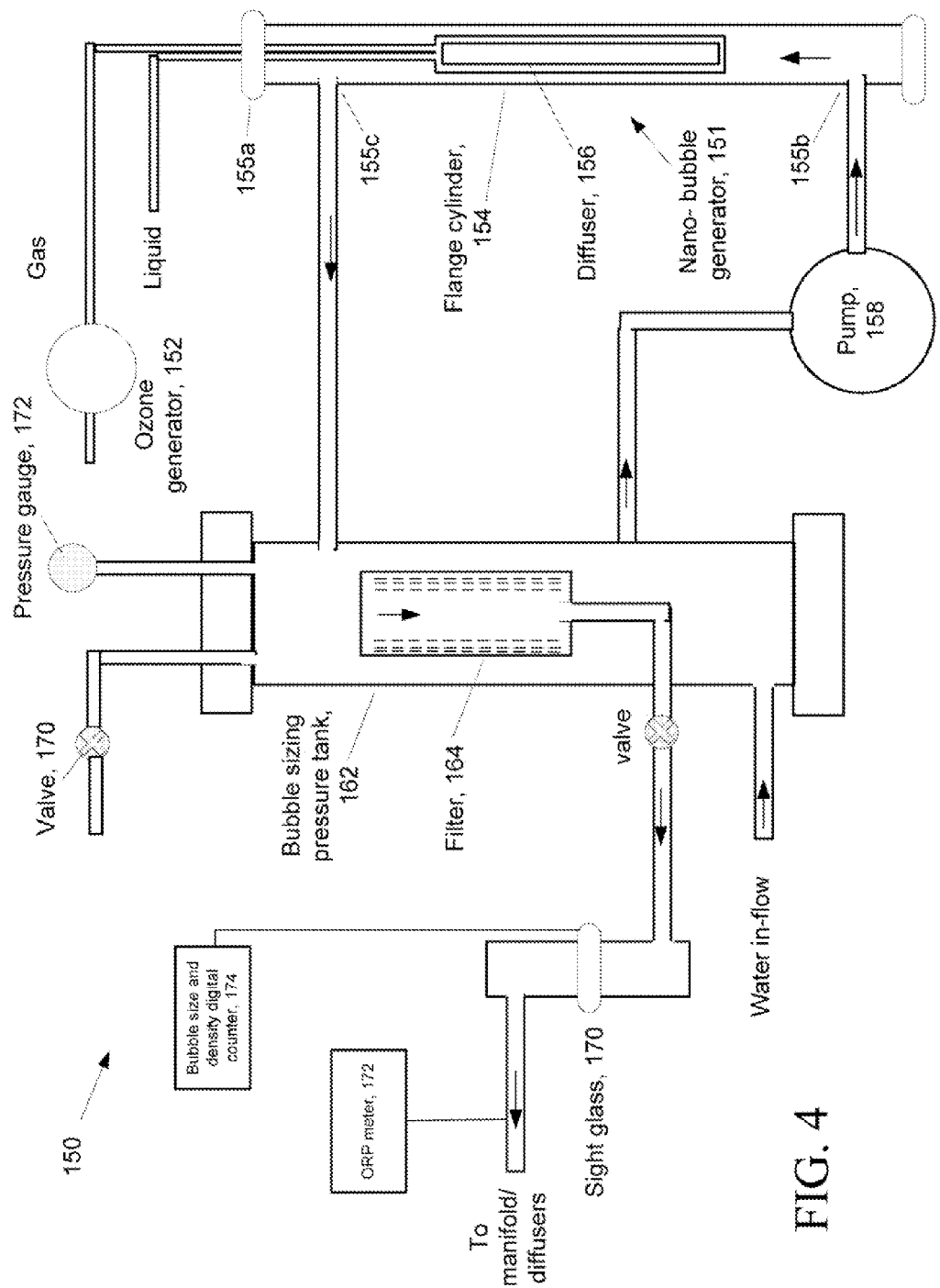
FIG. 4 is a schematic of a Nano-bubble generator.

Referring now to FIG. 3A specifically, the chemical oxidation treatment system 40, includes a Nano-bubble generator 151, as discussed in FIG. 4 that feeds an ozone/peroxide stream of Nano-bubbles to diffusers 43 disposed in a baffled treatment tank 44. The diffusers 43 can be of any type such as slotted screen (e.g., 10 slot) and can alternatively be, e.g., laminar microporous diffusers or LAMINAR SPARGEPOINTS® from Kerfoot Technologies, Inc. Mashpee Mass., as described in U.S. Pat. No. 6,436,285 incorporated herein by reference in its entirety. Typically, this arrangement could be used for relatively high to moderate daily volumes of fluid.

Referring now to FIG. 3B specifically, the chemical oxidation treatment system 40, includes a Nano-bubble generator 151 as discussed in FIG. 4, and uses a pressure tank 162, which as discussed in FIG. 4 is used with the nano-bubble generator 151 that is used to accept and treat water in lieu of a baffled treatment tank 44, as discussed in FIG. 3A. Typically, this arrangement could be used for relatively low daily volumes of fluid.

Referring now to FIG. 3C, an alternative arrangement, specifically has the chemical oxidation treatment system 40 including plural Nano-bubble generators 162 as discussed in FIG. 4 that feed streams of air/ozone/hydrogen peroxide to diffusers or slotted screens 43 disposed in baffled treatment tank 44. In this embodiment, the plural Nano-bubble generators 162 are configured to feed groups of one or more of the baffled segments in the treatment tank. Typically, this arrangement could be used for relatively very high daily volumes of fluid.

The contaminated water is removed from the baffled treatment tank 44, is filtered to remove metal precipitates 45, partially desalinated 46, and is allowed to reside in a storage tank 48 for a period of time, e.g., 1-2 months, for discharge in surface waters or less than 2 weeks (or immediately) for re-induction into a new drill hole to break down paraffins and other materials to increase hydraulic conductivity. These additional processing features would be needed only on a case by case basis. For example in treatment streams that clearly did not have any metals or salts to be removed, those elements could be eliminated.

Liquid is output from the Nano-bubble generator 151 discussed below and includes a cloud of Nano-bubbles, and is delivered to a bank of solenoid controlled valves 49 to feed tubes that can be disposed in the tank(s) 44.

Referring to FIG. 4, a system 150 for treatment of wastewater and/or frac-water is shown. An ozone generator 152 fed via, e.g., dry air or oxygen feeds ozone to a Nano-bubble generator 151 provided by a flanged cylindrical member 151 having flanged ends. Other arrangements are possible. The flanged cylinder 154 has disposed therein a microporous diffuser element 156. The cylinder 154, includes a flanged end cap portion 155*a* that receives one or more fluid supply lines, here two fluid supply lines (e.g., pipes, tubing, etc.) are shown, an inlet 155*b* disposed at a bottom portion of the cylinder 154, and an outlet 155*c* disposed in an upper portion of the cylinder 154. The cylinder 154 has a bottom flanged end cap portion (not numbered) that with the top flanged end cap portion 155*a* seals off the cylinder 154.

The flanged end cap 155*a* holds appropriate fittings (not shown) for tubing that provides the gas and liquid lines respectively. That is, in one embodiment the flanged end cap portion 155*a* can include fittings to receive the fluid supply lines from the ozone generator and the liquid source and then have separate fittings or separate portions of the same fittings to couple interior fluid supply lines (not shown) to the microporous diffuser. Alternatively, the fluid supply lines from the ozone generator and the liquid source can pass through the flanged end cap portion 155*a* to the diffuser. The flanged end cap portion 155*a* can instead be a pass-through for the fluid lines, which would be sufficiently sealed where the lines pass through the flanged end cap 155*a* to withstand operating pressures encountered within the cylinder 154.

As above, the diffusers 156 can be of any type but preferably are laminar microporous diffusers or LAMINAR SPARGEPOINTS® from Kerfoot Technologies, Inc. Mashpee Mass., as described in U.S. Pat. No. 6,436,285 incorporated herein by reference in its entirety or SPARGEPOINTS® types of microporous diffusers from Kerfoot Technologies, Inc. Mashpee Mass.

The microporous diffuser element 156 (diffuser 156) is fed by one or more fluids, here a gas and a liquid, e.g., e.g., the ozone/air or ozone/oxygen/air mixture from the ozone generator 152 and water or hydrogen peroxide, through the flanged portion 155*a* of the cylinder 154. A compressor (not shown) is typically disposed between a gas supply (not shown) and gas supply lines that feed the microporous diffuser 156 via the ozone generator 152. The compressor can be on either side of the ozone generator 152 but is generally between the ozone generator 152 and the flanged cylinder 154.

Through the inlet 155*a* of the flanged cylinder 154 is fed a liquid, typically water, via a pump, here a centrifugal pump 158. A pressurized tank 162 feeds the water to the pump 158. Within the pressurized tank 162 is disposed a filter 164. The pressurized tank 162 and filter 164 provides a bubble sizing chamber to permit control of bubble sizing. An outlet portion 155*c* of the flanged cylinder 154 is coupled via a supply line to an upper portion of the pressurized tank 162. Coupling of the flanged cylinder 154, the pressurized tank 162 and the pump 158 provides a recirculation path of water infused with bubbles through, (the appropriate supply lines).

The arrangement of the bubble chamber and the flanged cylinder 154 and pump (as well as the fluid lines) operates at higher flow rates and pressure than which water is drawn into and out of the bubble chamber 162. That is, exemplary flow rates at the output of the cylinder 154 to the output of the bubble sizing tank 162 are in a range of, e.g., 20 to 50 g/m, whereas flow rates in the water inflow to the bubble sizing tank from the source of contaminated water and outflow from the bubble sizing tank 162 to the manifolds are in a range of e.g., 2 to 5 g/m. Thus, there is a 10 fold (exemplary multiple) increase in water circulation about the loop formed between the nano-bubble generator and the bubble sizing chamber when compared to ingress and egress of water to the rest of the system. Generally, the multiple can be from 1 to about 30, which can be achieved by adjusting either the inflow flow rate or the pumping flow rate. Other multiples are possible, such as about 5 to 15, but it is generally preferable to have the multiple greater than 1.

The use of the pressurized tank 162 with the filter media permits selecting a discrete range of bubble sizes for bubbles leaving the generator 151 while also allowing the pressurized tank 162 to concentrate bubble density by recycling the liquid, bubble emulsion back to the diffuser 156. The generated bubbles are negatively charged, so the bubbles tend to repel other bubbles thus avoiding coalescing. By changing the recycling flow by the centrifugal pump, it is possible to build the density of the bubbles up amount of 2-10 times greater density than would result from a single pass through the diffuser 156.

The microporous diffuser 156 is disposed within the flanged cylinder 154 in a relatively close fitting relationship between the diffuser and the flanged cylinder 154. The bubble generator device has an outer diameter of the diffuser approximately in a range of about 0.55 to 0.90 of the inner diameter of the outer casing member. Other ranges could be used. For example the bubble generator device could have an outer diameter of the diffuser approximately in a range of about 0.7 to 0.90 of the inner diameter of the outer casing member. For instance, with a 2.0 inch diameter microporous diffuser the inner diameter of the cylinder 54 is in a range of about ⅛" to ¼." Other ranges could be used. In addition, the ratio of fluid to water (L/G ratio) is in the range of about 1 to 10 with other ratios being possible.

The nano-bubble generator 151 provides several advantages such as the ability to produce bubbles on a continuous instead of pulsed basis, whether the bubbles generated are of Nano-bubbles or coated Nano-bubbles. Specifically with respect to the LAMINAR SPARGEPOINTS® gas is delivered to a central porous member in the LAMINAR SPARGEPOINT.® Liquid is delivered in a space between the central member and an outer member of the LAMINAR SPARGEPOINT.® Coated bubbles, emanate from the porous sidewalls of the LAMINAR SPARGEPOINT® and axial flow along the inner portion of the flanged cylinder 154 provides sheering of bubbles on exit from the outer surface of the diffuser 156. The pore size is on the microporous diffusers are about 0.1 to about 0.2 micron range to encourage nano-bubble size (<1 micron) size bubbles. Visually, the formation of the "milky cloud" condition in the water column indicates the Nano-bubble stream (sight glass).

A excess gas line is connected via a check valve 170 to pressure tank to bleed off excess air from the Nano-bubble solution generator. A pressure gauge 172 monitors pressure. A controller/timer (not shown) controls the compressor and solenoid control valves.

In FIG. 4, an in-pipe insert (reverse venturi) is placed after a centrifugal pump with flow recycling with a storage tank. If the flow velocity is insufficient to generate sufficient shear velocity across a pipe insert near a pumping well, the flow is increased in the loop by re-circulating the volume of water multiple times. In addition, with each pass, the density of nano-bubbles increases, permitting adjustment of the final density of the bubble emulsion when releasing the flow back to the pipe. The flow recycles ten times, bleeding off a flow about ⅕ to ¹⁄₁₀ its recycle volume/minute.

If the flow volume being pumped is too large a volume to send directly through a loop type, the loop type can be mounted by the side of the pipe, withdrawing only a fraction (10-40%) of the pipe flow, fully mixing in the nano-bubbles and re-injecting the fraction back into the pipe flow. It is also much easier to maintain since the main pipe flow need not be turned off during cleaning operations.

Figures 6A, 6B:
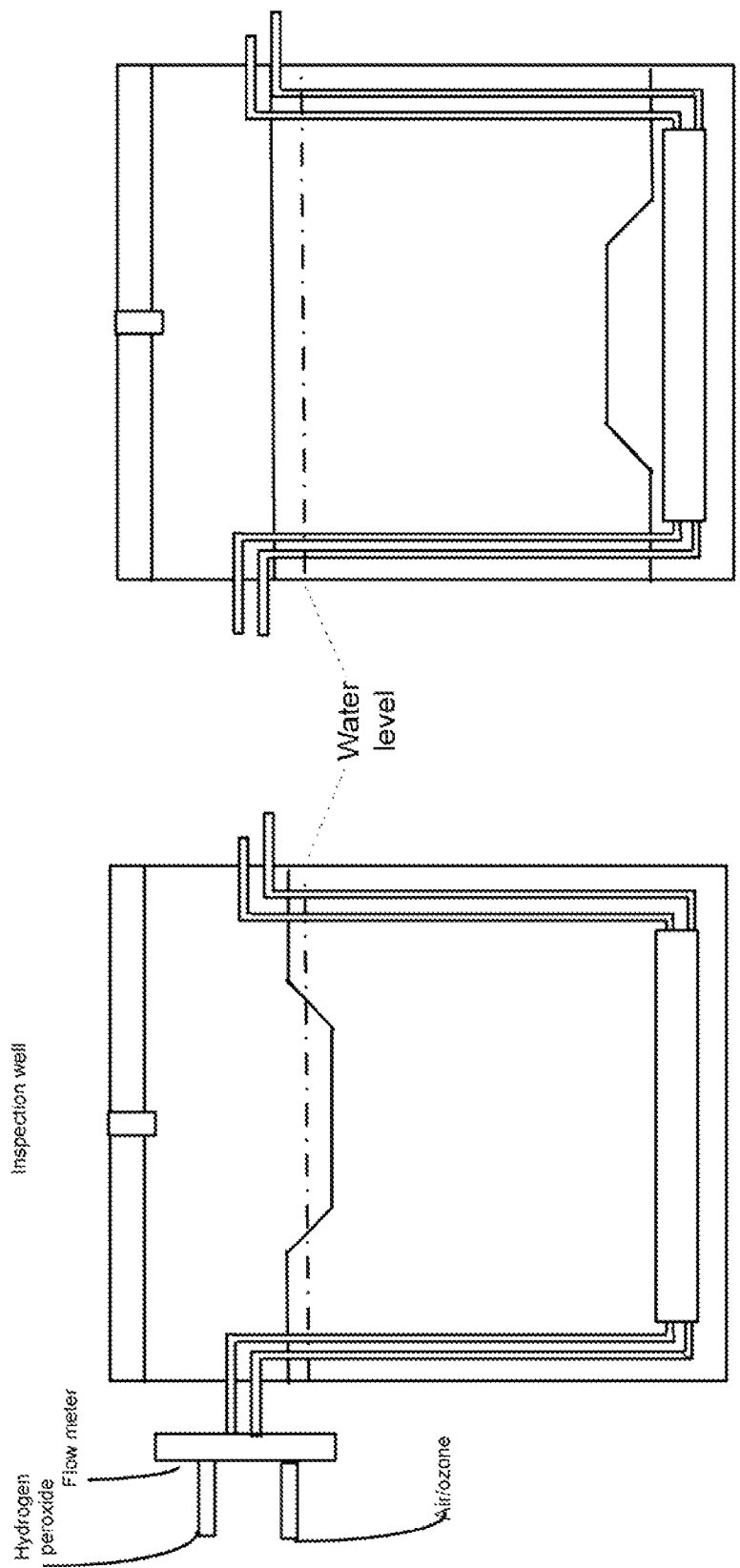

An example of a baffled treatment tank is disclosed in U.S. Pat. No. 6,436,285 which is incorporated herein by reference in its entirety. An alternative example is shown in FIGS. 5A-5B, the details of the coupling of the microporous diffusers 43 in the tank 44 being omitted for clarity in these figures, but exemplary connection arrangements are shown in FIGS. 6A and 6B. In this example, the baffled treatment tank 44 has a vessel or body portion 44b generally here rectangular, and has baffles 44a that are displaced in a vertical dimension to permit circulation down one chamber and up an adjacent chamber, as shown in FIGS. 6A and 6B.

The treatment tank thus includes, in addition to the vessel 44b, an inlet 45a to receive contaminated water and a plurality of chambers that are provided as partitions in the vessel by the baffle 44a that extend between two opposing sides of the vessel 44b with a first group of the baffles 44a having a portion that extends above a surface level of the water and a second group of the baffles 44a having bottom portions that is displaced from a bottom surface of the vessel 44b. Diffusers 43 are disposed in the chambers to introduce a gaseous and liquid into the chambers and the vessel includes an outlet. As discussed, in some embodiments, some or all of the chambers have a Nano-bubble generator disposed to deliver Nano-bubbles of ozone/air coated with hydrogen peroxide. The baffles have a spill-way portion on the top of the baffles that extend above the water line level or a spill-way portion on the bottom of the baffles that are displaced from the bottom of the vessel. The baffled tank 44 also includes an outlet 45b and in some embodiments a top cover member 44c so that the water is introduced into the tank 44 under pressure, e.g., typically less than 20 psi. In other embodiments the tank can be open and not operate under pressure.

Figure 7:
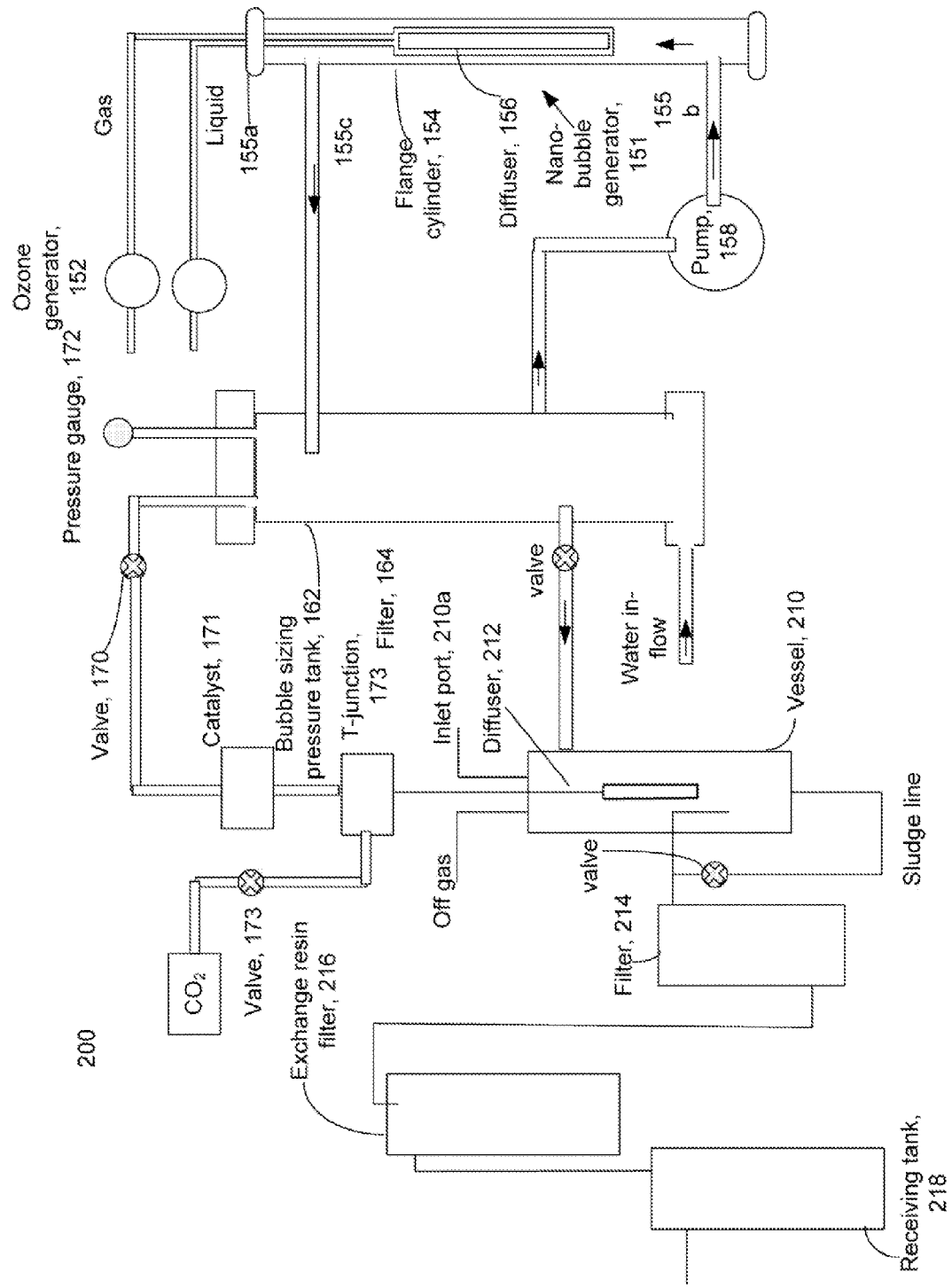
FIG. 7 is a schematic of an apparatus for treatment of frac-water employing a nano-bubble generator of FIG. 4.

Referring now to FIG. 7, an alternative system 200, especially adapted for treatment of frac-water includes the Nano-bubble generator 151 of FIG. 4, e.g., ozone generator 152 fed via, e.g., dry air or oxygen and the Nano-bubble solution generator including the flanged cylinder 154 and microporous diffuser element 156 arrangement, as in FIG. 4 above. The microporous diffuser element 156 (diffuser 156) is fed by one or more fluids, here gaseous ozone and a liquid hydrogen peroxide, through the flanged portion 155a of the cylinder 154. A compressor (not shown) is typically disposed between a gas supply (not shown) and gas supply lines that feed the microporous diffuser 156 via the ozone generator 152. The compressor can be on either side of the ozone generator 152 but is generally between the ozone generator 152 and the flanged cylinder 154.

Through an inlet 155b of the flanged cylinder 154 is fed a liquid, typically water, via a pump, here a centrifugal pump 158. A pressurized tank 162 feeds the water to the pump 158. Within the pressurized tank 162 is optionally disposed a filter 164 that in combination with the pressurized tank 162 provides a bubble sizing chamber to permit control of bubble sizing. An outlet portion 155c of the flanged cylinder 154 is coupled via a supply line to an upper portion of the pressurized tank 162. Coupling of the flanged cylinder 154, the pressurized tank 162 and the pump 158 provides a recirculation path of water infused with bubbles through the appropriate supply lines. A excess gas line is connected via a valve 170 to pressure tank to bleed off excess air from the Nano-bubble solution generator. From an output of the valve 170 the gas from the pressurized tank 162 will enter a catalyst 171 that can convert the gas to $CO_2$ resulting from breakdown of hydrocarbons in the pressurized tank 162, The output of the catalyst 171 is fed to a t-junction or the like which is also fed via an line from a $CO_2$ source to supplement the amount of $CO_2$ delivered to a vessel 210. The source can be from air separation, bottled gas or dry ice. A pressure gauge 172 monitors pressure within the pressurized tank 162. A controller/timer (not shown) controls the compressor and solenoid control valves. The pressurized tank 162 has an inlet that receives water to be treated and an outlet that removes water to treated having been infused with nano-bubbles of air/ozone coated with a peroxide.

The vessel 210 includes a microporous diffuser 212 disposed within the vessel 210. The vessel has a cap (not numbered) that includes an off-gas port, and a port to enable addition of an alkaline material, e.g., sodium hydroxide, to maintain the ph of the water within the vessel 210 at or above about 10. The vessel 210 receives the water from the outlet of the pressurized tank 162. The microporous diffuser 212 is fed by the stream of $CO_2$ and bubbles the $CO_2$ through the water from the pressure tank 162 and while maintaining a relatively high alkaline environment, via periodic addition of the sodium hydroxide (NaOH), enables precipitates of alkaline earth metals. e.g., strontium and barium to form, which are removed as a sludge from the bottom of the vessel. From the vessel 210 the water, now substantially free of alkaline earth metals, is fed to a filter 214, having an inlet 214a and an outlet 214b where transition metals such as Fe, Mn, Cu, and Zn, which have been previously oxidized by the ozone are filtered out. Adjustment to pH also allows any residue ammonia ($NH_3$) to be stripped out of the input stream. The outlet 214b of the filter 214 feeds the water to vessel 216 having an ion exchange resin to remove divalent cations, e.g., $Ca^{+2}$, etc. From the vessel 216 the treated water goes to a receiving tank 218 or can be re-injected or discharged.

Following the pre-treatment in the pressurized tank 162, precipitation of transition and alkaline earth metals, and converting ammonia to nitrates and stripping off any remaining ammonia and precipitation of calcium from the water stream, the remaining fluid is ideal for forming high grade salt solution or granulated salt that can be resold for road treatments, etc.

Pilot Test Results of Brine Water Treatment from Nanozox ™/$CO_2$ Sequestering System

|  | Raw Water | Nanozox ™ | System End |
|---|---|---|---|
| Volatile Organic Compounds (VOCs) (µg/L-ppb) | | | |
| Benzene | 240 | ND | ND |
| Ethylbenzene | 13 | ND | ND |
| Toluene | 190 | ND | ND |
| Xylenes | 110 | ND | ND |
| n-Butylbenzene | 2.7 | ND | ND |
| Naphthalene | 17 | ND | ND |
| n-Propylbenzene | 2.5 | ND | ND |
| 1,3,5 Trimethylbenzene | 18 | ND | ND |
| 1,2,4 Trimethylbenzene | 35 | ND | ND |
| Metals (alkaline and transitional) (mg/L-ppm) | | | |
| Barium | 175 | 69.6 | 7.65 |
| Calcium | 9800 | 6800 | 2573 |
| Iron | 20 | ND | ND |
| Magnesium | 1100 | 850 | 802 |
| Sodium | 24,000 | 24,000 | 29,446 |
| Strontium | 790 | 530 | 142 |
| General Chemistry (mg/L) | | | |
| Solids, total dissolved | 100,000 | 87,000 | 81,900 |
| Chloride | 60,000 | 53,000 | 51,688 |
| Nitrogen, ammonia | 56.6 | 39.6 | 25.37 |
| Nitrogen, nitrate | 0.11 | 1.8 | NA |
| Sulfate | ND | ND | 14 |
| Bromide | 570 | 550 | NA |

ND = Not detectable
NA = Not analyzed

Referring now to FIGS. 8A and 8B, a venturi-type cylindrical nano-bubble generator 240 for pulsed injection of nano-bubbles of ozone/air and a peroxide into a water stream is shown. As shown in FIG. 8A the cylindrical nano-bubble generator 240 generally has a circular, composite outer casing and includes a first flange 242 and a first cylindrical tube 246 having a first diameter, between which is connected an intermediate tube 244 having a conical portion 244a with a wider opening at an end of the tube 244 coupled to the first flange 242 and a narrower opening over a portion 244b of the intermediate tube 244 that extends for a length in a constant, cylindrical cross-sectional area, and which is coupled to a first end of the first cylindrical tube 246. At a second end of the first cylindrical tube 246 is a flanged portion 248 of a second cylindrical tube 250. The second cylindrical tube 250 has a larger diameter than first cylindrical tube 246 and is connected to a second flange 252 at a second end of the second cylindrical tube 250. In this nano-bubble generator 240, the constriction 243 is where the conical portion 244a meets the cylindrical portion 244b of the intermediate tube 244 to produce the so called venturi effect. Ports are provide in sidewalls of the first and the second cylindrical tubes. A first pair of ports are fed a liquid, e.g., hydrogen peroxide (or a peroxide) and a gas, e.g., ozone/air to the first tube. A second pair of ports are fed the same (or a different liquid) liquid, e.g., hydrogen peroxide (or a peroxide) and a gas, e.g., ozone/air to the second tube.

Each of the first and second cylindrical tubes have the construction depicted in detail in FIG. 8B. An outer casing of the first tube is comprised of a solid material, e.g., a ceramic, stainless steel, or sintered glass, or a plastic such as HDPE, Kynar, etc. Within the outer casing is a first sleeve 260 and a second sleeve 262 each, comprised of porous, preferable nano-porous materials (ceramic, stainless steel, plastic, etc.). Between the first and second sleeves are disposed porous media, e.g., glass beads. Typically, each of the aforementioned members are welded together or the like, as appropriate. Alternatively, these elements can be formed as integral elements. The members can be comprised of any materials that are suitable for the products/chemicals that they will come into contact with. For example, stainless steels, ceramics, and high density plastics can be used. The porosity of porous members is generally less than a few microns, more preferably less than a micron and lower such as less than 0.5 microns and smaller, e.g., to about 0.1 microns.

The first sleeve 260 is spaced from the outer casing by a gap 297 of about 0.1 to 0.2 inches for a 4 inch sleeve. The gas discussed above is introduced into this gap. Meanwhile, the liquid is introduced into the porous media. Water to be treated is passed through the interior region defined by an inner surface of the second sleeve. Coated Nano-bubbles of ozone/air having a peroxide coating are placed into contact with the water. The injector ports are coupled to pulsed sources of the air/ozone and liquid. Pulsing for the liquid occurs at 0.1 to 2 seconds per stroke, whereas for the gas there are, e.g., 25 strokes per sec for 50 psi. Other arrangements are possible.

This arrangement generates Nano-bubbles by forcing gas through micron to submicron-sized porous material through spherical porous material with an oscillating (pulsed) liquid. In a pulsed framework entrapped gas bubbles will shear to sizes less than the pore neck. The positive outwards pressure of the gas and liquid carries the Nano-bubbles out of a nanoporous porous cylinder which is also subjected to a continuous shear surface with rotating liquid (usually water) or pulsed water to force further shear bubbles.

Referring now to FIGS. 9A and 9B, a venturi-type conical nano-bubble generator 270 for pulsed injection of Nano-bubbles of ozone/air and a peroxide is shown. As shown in FIG. 9A the conical nano-bubble generator 270 generally has a conical outer casing and includes a flange 272 and a first tube 274 having a conical portion 274a with a wider diameter at an end of the tube 274 coupled to the flange 272 and a narrower opening at an end of the conical portion. The conical portion 274a of the tube 274 has a portion 274b that necks down to a cylindrical portion 274c with a constant cross sectional area. An end of the cylindrical portion 274c of the first tube 274 is coupled to an arrangement that holds porous media, discussed below. The conical nano-bubble generator 270 also includes a second conical tube 278 having a first end connected to outer wall portions of the first tube 274 in the vicinity preceding the neck down region 274b of the tube 274. At a second end of the second cylindrical tube 278 is a second flange. The second conical tube 278 has a larger diameter at the second flange than first cylindrical tube 274 has at the first flange 272. A first end of the second conical tube 278 is coupled to an outer surface of the first conical tube, via a weld or the like. Ports are provide in sidewalls of the second conical tube to receive a liquid, e.g., hydrogen peroxide (or a peroxide) and a gas, e.g., ozone/air. The second conical tube 278 is coupled to a second flange 280.

An outer casing of the first tube is comprised of a solid material, e.g., a ceramic, stainless steel, or, or sintered glass, a plastic such as HDPE, Kynar, etc. Disposed within the second conical tube, as depicted in detail in FIG. 9B, is a first sleeve 292 and a second sleeve 294 each, comprised of porous, preferable nano-porous materials (ceramic, stainless steel, plastic). Between the first and second sleeves are disposed porous media, 296, e.g., glass beads. Typically, each of the aforementioned members are welded together or the like, as appropriate. Alternatively, these elements can be formed as integral elements. The first sleeve 292 is spaced from the outer casing by a gap 297 of about 0.1 to 0.2 inches for a 4 inch sleeve. The gas discussed above is introduced into this gap 297. Meanwhile, the liquid is introduced into the porous media 296 (about 0.5 inch). Water to be treated is passed through the interior region defined by an interior of the first conical portion and the cylindrical portion of the first tube, and an inner surface of the second sleeve. Coated nano-bubbles of ozone/air having a peroxide coating are placed into contact with the water as the water passes through the interior of the second tube. The inlet ports are coupled to pulsed sources of the air/ozone and liquid with similar rates as discussed above for FIGS. 8A and 8B.

Both the cylindrical and the conical nano-bubble generators 240, 270 of FIGS. 8A-B and 9A-B are adapted for production of nano-sized bubbles entrapping a gas, e.g., air/ozone and coated with a liquid, e.g., a peroxide. In addition, in some embodiments the cylindrical and the conical nano-bubble generators of FIGS. 8A-B and 9A-B are substituted for the microporous diffuser element 156 of FIGS. 3A-3C, 4 and 7, as the nano bubble generator to provide a source of nano bubbles for the respective systems. In other embodiments the cylindrical and the conical nano-bubble generators of FIGS. 8A-B and 9A-B are substituted for the nano bubble generator 151 of FIGS. 3A-3C, 4 and 7.

In FIG. 9A-B the flow moves through two cones configured to provide "a throat," with the downstream surface containing the laminate material that receives the liquid. Depending on the pressure drop across the porous bead layer, a liquid pump may or may not be required, but the liquid flow is oscillated. The pressure drop in the downstream cone creates a negative pressure (siphon) which can pull liquid (peroxide) into the downstream flow.

In FIGS. 8A-B, the second set of has a set venturi-like sequential cylinders in place of the downstream cone. These also produces a negative pressure (siphon) which can pull liquid into the porous cylinder and emit nano-bubbles into the downstream flow.

Figure 10A:
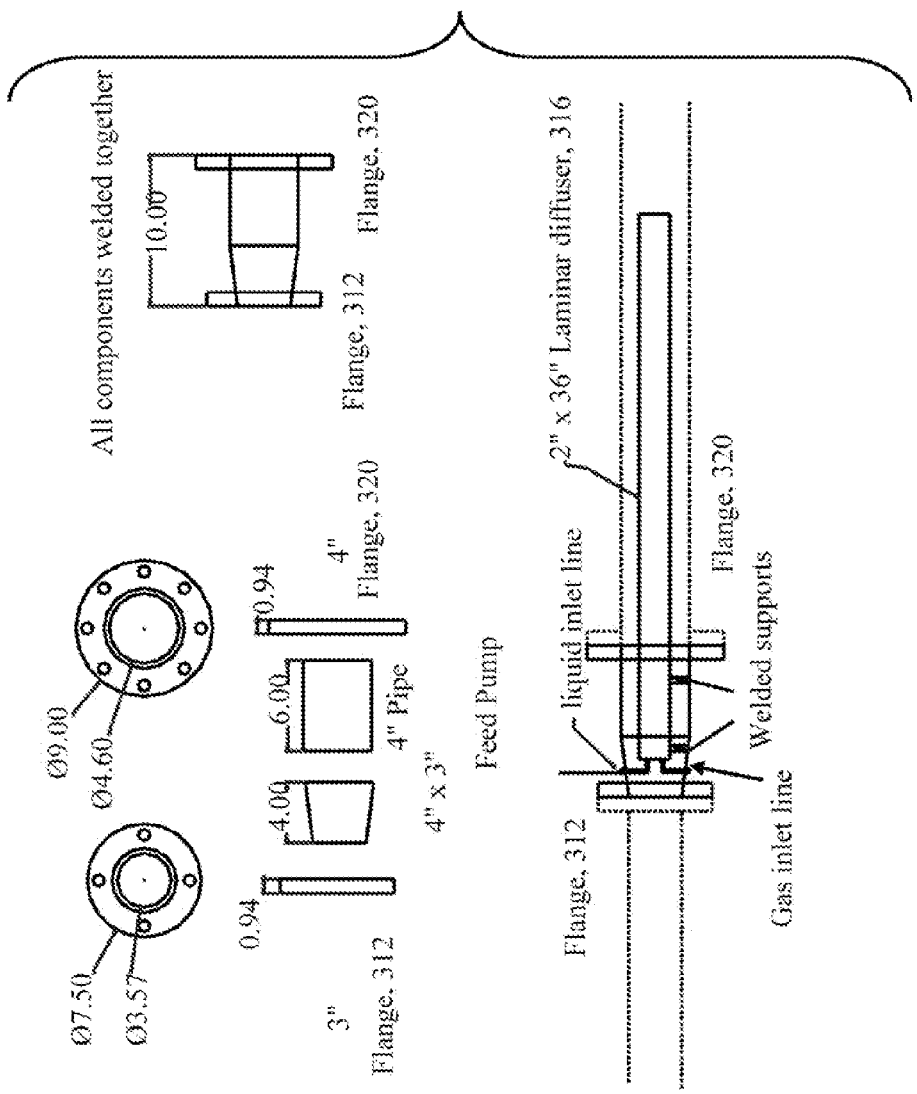
FIG. 10A are views of details of the in-line bubble generator used in FIG. 10.

Referring now to FIG. 10, an inline treatment apparatus, 300 for treatment of waste water or frac-water (as illustrated) is shown. The inline treatment apparatus 300 includes a venturi injector 310 that includes a first flange 312, a tube 314 having a first cylindrical portion 314a with a first cross section over a certain distance and a second cylindrical portion 314b with a second, larger, cross section that meets the first cylindrical portion at a neck down region 314c that provides constriction for the venturi injector. A microporous diffuser 316 is disposed through the second cylindrical portion of the first tube 314 and is supported by a second flange 320. A second tube 322 having the same cross section as the cross section of the second cylindrical portion 314b of the first tube 314 is coupled a second end of the second flange 320. The microporous diffuser 316 extends into the second tube 322 for some distance. The microporous diffuser 316 produces nano or micro sized bubbles (of air/ozone with a liquid, e.g., hydrogen peroxide coating) that are introduced into the waste water or frac-water stream (as illustrated). The microporous diffuser is of the laminar type discussed above.

As also shown in FIG. 10, the venturi injector is couple to conventional piping and a well pump that is disposed within a well. The piping includes a valve and a pressure gauge. Also shown are a control mechanism and sources of the ozone and hydrogen peroxide. Here the laminar point is placed inline as a porous cylinder, surrounded by the water flow to be treated, where the cross-sectional area around the cylinder is less than the initial pipe cross-sectional area, producing a localized rise in liquid to migrate into the nano-bubble gas phase, typically using a liquid pump (oscillated) to overcome fluid pressure and create porous shear.

Figure 11:
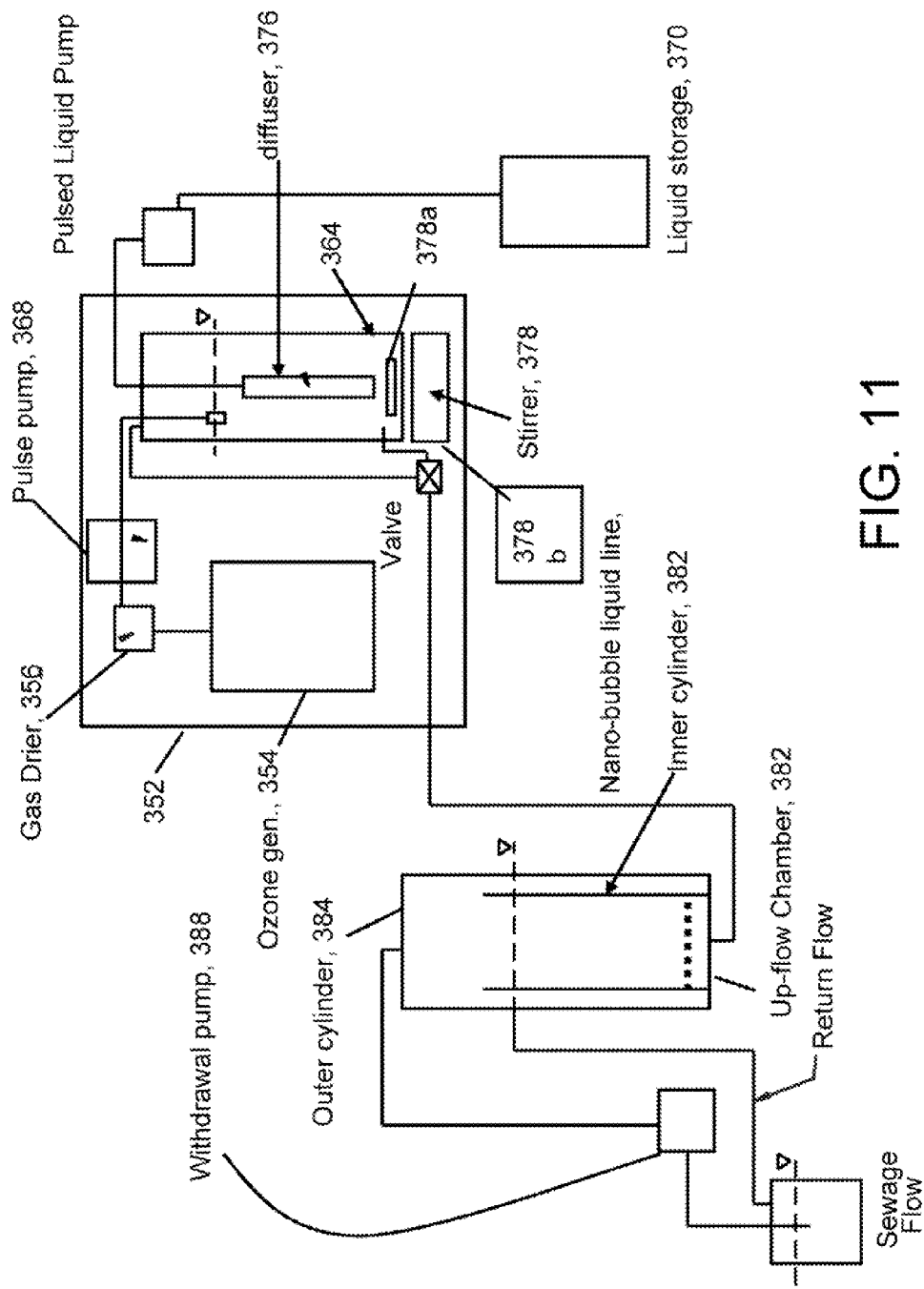
FIG. 11 is a schematic view of an alternative treatment apparatus especially adapted for waste water treatment.

Referring now to FIG. 11, an alternative treatment apparatus 350 especially adapted for waste water treatment is shown. The apparatus 350 includes a nano-bubble generator system 352 that includes a gas source, e.g., an ozone generator 354 that feeds air/ozone gas to a gas dryer 356 from which a pulse pump 368 delivers the dried air/ozone gas to a inlet that is contained within a bubble chamber 364, (a pressurized vessel). A microporous diffuser 376 (discussed above) receives liquid that originates from liquid storage, (tank, barrel, etc.), and which is delivered to the diffuser 376, via a second pulsed pump 374. In some embodiments the liquid is hydrogen peroxide or another type of peroxide. A stirrer assembly 378 comprising a magnetic stirrer element 378a and a magnetic stirrer control 378b agitates fluids in the chamber 364. The stirrer element 378a is disposed on the bottom of the chamber 364 and shears bubbles off of the microporous diffuser. Nano-bubbles of the liquid, e.g., hydrogen peroxide entrapping the air/ozone gas are produced and delivered from the chamber 364 via nano-bubble liquid line 379 to an up-flow chamber 382. The up-flow chamber 382 includes an inner cylinder member 382 having no top, and an outer cylinders member 384, which forms an enclosed chamber, as illustrated. Sewage flow enters the outer cylinder via a port (not show) and mixes with the nano-bubble fluid stream that enters from the bottom of the up flow chamber. The inner cylinder 382 is present to provide up-flow of bubbles against down flow of waste water to try to balance bubble rise excess of down-flow of the liquid. Treated waste flow is drawn out of the up flow chamber 382 and returned to the distribution box where it flows to a leaching field.

Here the stream of wastewater to be treated is low flow and slow, such as domestic wastewater. The nano-bubbles are generated in an axial tube with centrifugal stirring and intermittent discharge from the tube into a section of up-flow through the downstream flow of water.

Figure 12:
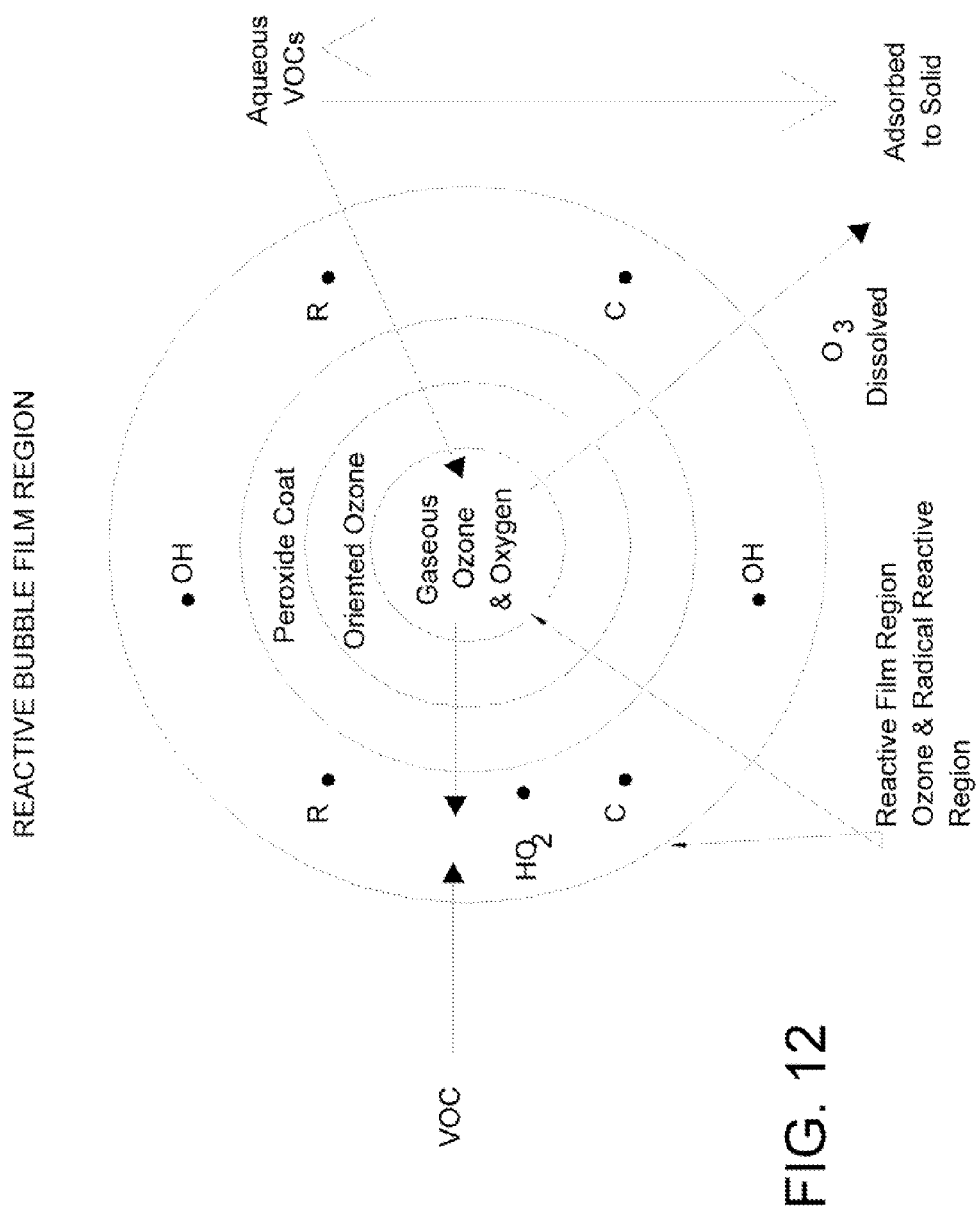
FIG. 12 is a diagrammatical view of an exemplary construction for bubbles.

Referring now to FIG. 12, an exemplary bubble that results from operation of the nano-bubble generators under specific conditions is shown. A central region of the bubble contains air/ozone/oxygen, disposed about that central region is a region of orientated ozone. Such oriented ozone is more particularly described in my co-pending patent application Pub. No US-2008-0061006-A1 Ser. No. 11/516,973 filed Sep. 7, 2006 the contents of which are incorporated herein by reference in their entirety.

Figure 12A:
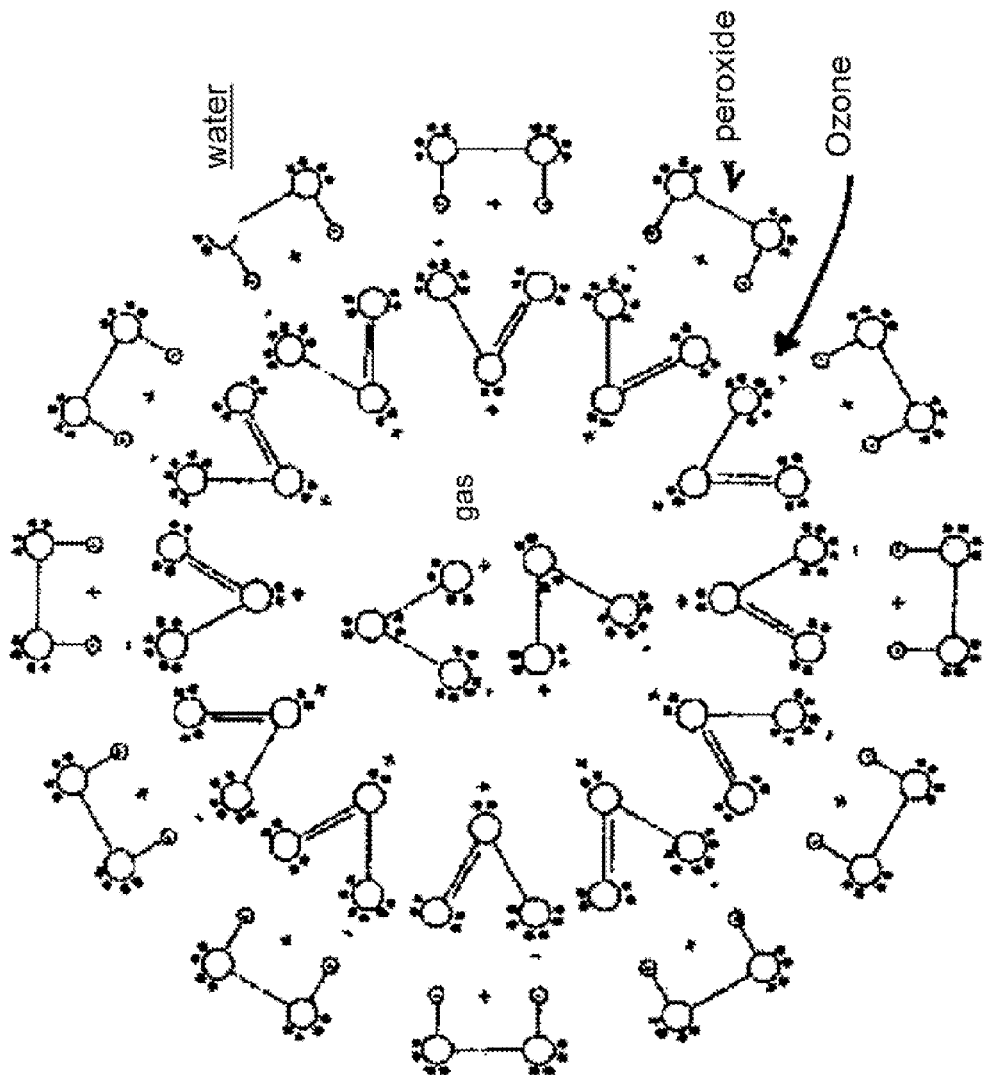
FIG. 12A is a diagrammatical view of an exemplary construction of a bubble with orientated ozone with peroxide coating.

About the orientated ozone is a region or layer of a peroxide coating (present when a laminar diffuser is use or other mechanism is used to place a peroxide into a bubble generator. Over the peroxide coating is a layer of water, the aqueous solution that carries the bubbles, as illustrated in FIG. 12A, which shows the peroxide layer over the oriented ozone layer.

In water solutions containing emulsified petroleum product (light non-aqueous petroleum liquid—LNAPL), nano-bubbles of ozone/air gas with a peroxide coat breaks down organics efficiently. Volatile organic compounds are driven out of solution or from their product surfaces across a highly-reactive zone surrounding the bubbles. Henry's and Raoult's laws are commonly used to understand equilibrium vapor concentrations governing volatization from liquids. The volatility of organic carbon can be depicted as a four-phase system. If the water is contaminated with immiscible fluids and water-soluble fractions, volatizations are governed by both Henry's law and Raoult's law. Dissolved VOCs can quickly move from solution into gas-bearing bubbles. With ozone oriented along the surface film of the gas bubble, a powerful reactive zone is provided containing both hydroxyl radicals (.OH), and radical carbon intermediates (.C), and other free radicals (.R).

Figure 13:
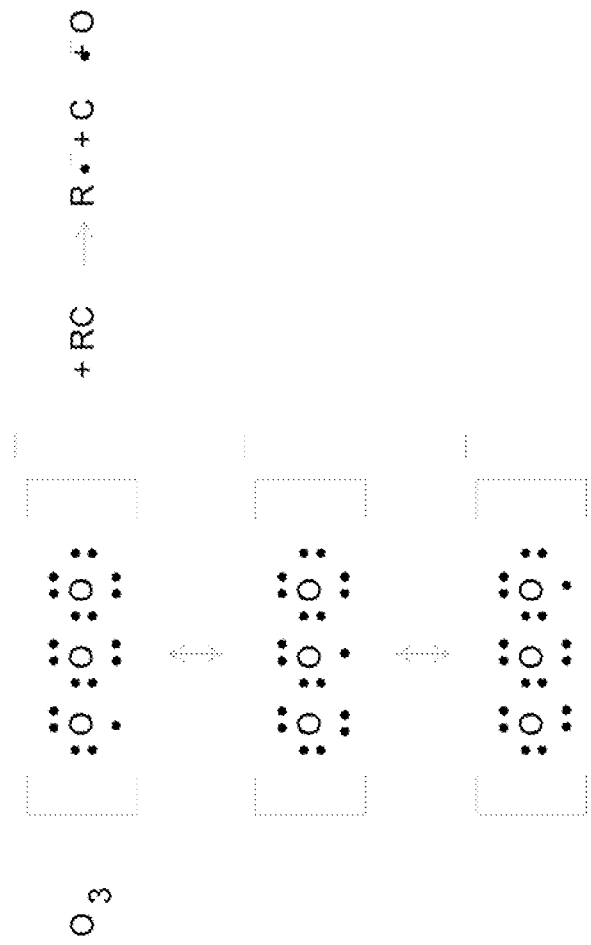
FIG. 13 is a series of Lewis structure or electron dot diagrams depicting free electron configurations of ozone.

Referring now to FIG. 13, a series of Lewis structure or electron dot diagrams depicting free electrons for various configurations of ozone involved in the Criegee-Type reactions with hydrocarbons are shown. The structures show that the ozone has three different configurations that oscillate, meaning that the un paired electron is associated with each of the oxygen atoms at different types providing the specific structures depicted. The concentrated film reactive zones are consistent with the Criegee-type surface and hydroxyl radical reactions depicted between hydrogen peroxide and ozone interfaces. The orientation of the ozone and hydrogen peroxide molecules allow a far faster breakdown of alkane structures, because elongate molecules are simultaneously attacked at several nuclear centers of the elongate molecule, rather than be simply broken in half, as is common with dissolved ozone or dissolved ozone/peroxide mixtures.

Referring now to FIG. 14 and exemplary arrangement for sparging is shown. This arrangement, as well as others, can use any of the various nano bubble generators described herein for treatment of contaminants in ground water, as described for example in my co-pending patent application Pub. No US-2008-0061006-A1 Ser. No. 11/516,973 Filed Sep. 7, 2006 the contents of which are incorporated herein by reference in their entirety.

Example

Kerfoot Technologies, Inc. injected coated ozone nano-bubbles with the in-line arrangement depicted in FIG. 10 into a well pump station to reduce TCE mass during transport of about 5,250 feet of 4" SDR-11 HDPE (3.633" ID) to a treatment facility with a travel time of 16 minutes. Reduction or elimination of mass before arrival at the facility would reduce the need for activated carbon regeneration or replacement. A mobile trailer system with a generator inserted at the well-head injected a stream of peroxide-coated nano-bubbles of ozone into the line flow of 175 gpm groundwater containing VOC's including approximately 45 µg/L TCE.

A series of tests were run to as controls and brief measures of kinetic variables of ozone, peroxide, and pressure. At maximum efficiency, 98.5% of the TCE and PCE mass were removed with as low as 45 gm/hr ozone and 144 gm/hr peroxide injection. An air-only control showed slight (3%) to no removal of inline VOC's.

Results of Pilot Test

After the inline laminar point was installed, a series of dosing events were planned:

Full ozone and peroxide
Full ozone and ½ peroxide
Ozone only
½ ozone
Air only control Groundwater samples were taken at the wellhead prior to the injector (00EW0001) and at the entrance to the facility (28PLT01050). The samples were delivered to KTI's laboratory for same-day analysis by PID—head space analysis with an HNU Model 300 gas chromatograph outfitted with a capillary column. Secondarily, a certain number of samples were split and forwarded by CH2 MHILL to Alpha Labs for analysis by EPA Method 8260, GCMS. All samples were documented by chain-of custody procedures.

Figure 15:
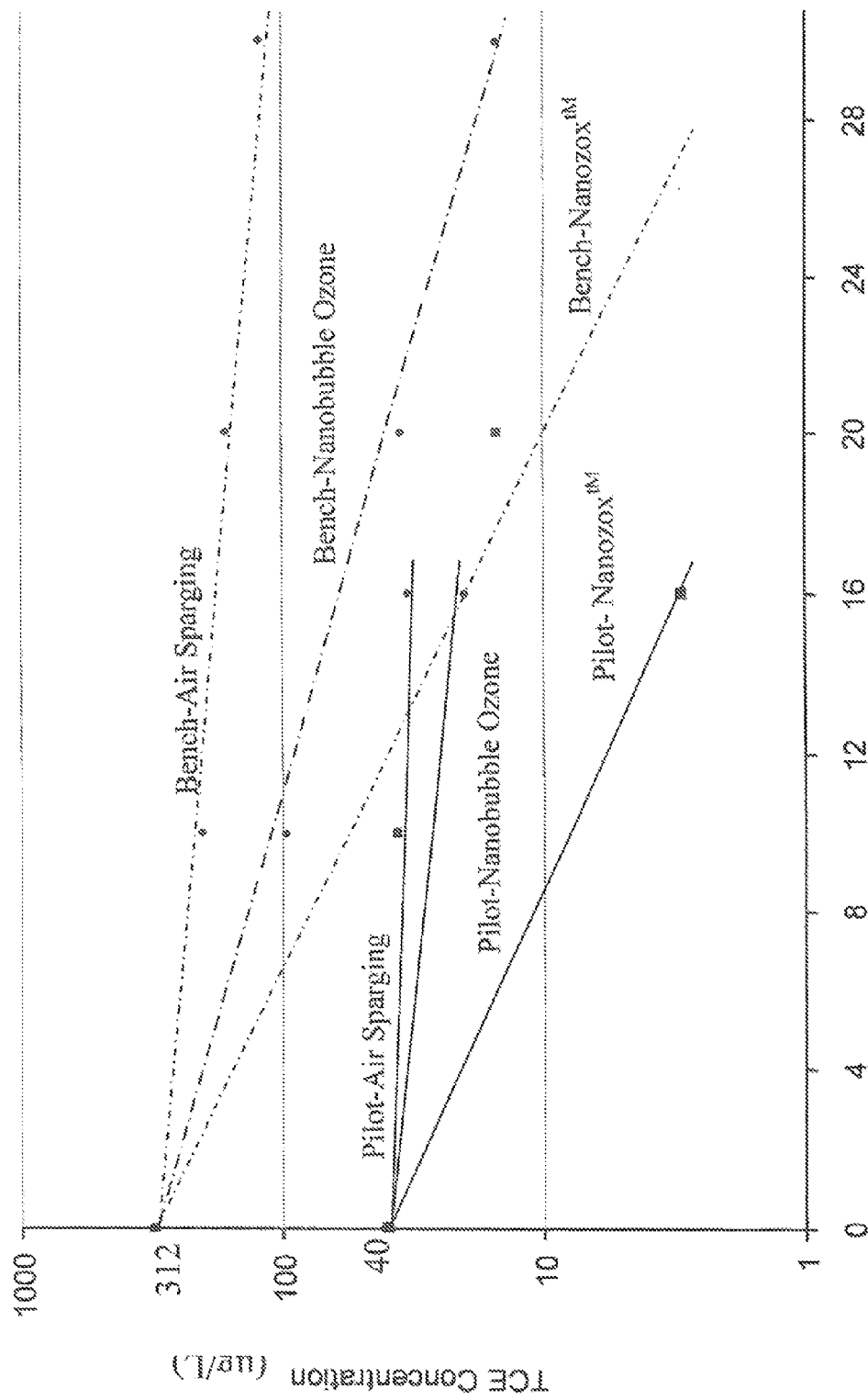
FIG. 15 is a graph.

FIG. 15 is a plot of observed TCE removal from the results. The concentration arriving at the facility was placed at 16 minutes, the travel time of groundwater from the wellhead pumping at 175 gpm. An identical rate of decay was observed to the bench-scale test, despite the mass loading being reduced. Wellhead concentrations of TCE at 40 to 45 µg/L were reduced to 3 to 0.66 µg/L by arrival to the facility, 92.5 to 98.5% mass removal with full dosage of injected coated ozone nano-bubbles. The split samples tended to show a 10% higher TCE level at wellhead than KTI lab analyses, and removal rates were slightly greater since the GCMS samples extended detection below 1 µg/L. Both analyses were highly consistent.

Of interest, the air control injection showed little or no loss of TCE concentration during passage. Even though stripping into nano-bubbles may have occurred, no off-gassing was possible within the pipe, compared to a small fraction released during the bench-scale treatment.

PCE concentrations were below 1 µg/L at the wellhead (CHTG0001). During test injections, the values were undetected upon arrival at the facility (CMT601050). Since a value was not known for "U," the efficiency of removal was not computed.

Several other chemical parameters were measured: temperature (Temp), specific conductance (SpC), dissolved oxygen (DO), pH, oxidation reduction potential (ORP, mV), and turbidity (Ntu). A hardly detectable temperature decrease was observed when comparing wellhead temperatures of groundwater to that arriving at the facility. No systematic specific conductance change was observed. This is not surprising since only a small volume of chemicals (189 gms per hour) is added to 10,500 gallons per hour of flow. Peroxide addition is about 7 gallons of 8% solution per day compared to the pipe flow of 252,000 gallons per day.

Commonly observed during previous operations, oxidation/reduction potential (ORP) is maintained in the low 220 mV range, similar to air addition, when ozone/peroxide as Nanozox™ is added in a near 1 to 1 molar ratio, but rises up above 400 mV addition (948.1 mV) when solely ozone is injected. In laboratory reactive dye tests (Kerfoot, 2009), the outward migrating dissolved ozone (DOZ) appears to react with the peroxide coating to form hydroxyl radical regions and secondary hydroperoxides rather than raise DOZ concentrations. With Nanozox™ addition, the ORP is maintained within ranges close to the original groundwater mean value 219±115 mV (Table 4).

Chemical Kinetics

The concentration of reactants and conditions was varied during the bench-scale and pilot test to help define the rate of reaction and needed conditions. The rate of removal of TCE was related to the reactant concentrations (in mole/liter form):

$$\text{Rate} = -kp[TCE]^m[M_{ox}]^n - kp[TCE]^M[\text{Max}]^n$$

Where:
$\text{Max} = M_{ozone} + M_{perozone} M_{ox} = M_{ozone} + M_{perozone}$
p=pressure difference (in bar=atm)
k=attenuation coefficient The concentration of TCE was 45 µg/L at the wellhead as original condition. The molecular (mole) ratio of ozone to peroxide was 1 to 1. Dropping peroxide to ½ concentration reduced the rate of drop of TCE by ½. Switching to nano-bubble ozone, instead of peroxide-coated ozone, resulted in a pronounced reduction of rate of removal (FIG. 15).

Pressure changes effectively amplified the reaction rate. The hydraulic pressure produced by the pump (60 psi, 5.0 bar) was 3.76 times higher than the pressure in the bench-scale flask (5.0 psi, 1.33 bar). The pressure difference boosts the Henry's partitioning constant of TCE (aqueous) moving into gas bubbles.

Temperature was close, in absolute temperature, between both the bench-scale (60° F., 15.5° C.) and the field conditions (55° F., 12.7° C.) (8.5° C./273° C.=1.0% lowering).

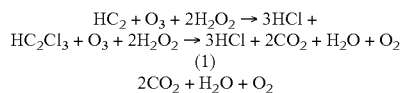

|  | $HC_2 + O_3 + 2H_2O_2 \rightarrow 3HCl +$ | | |
|---|---|---|---|
|  | $HC_2Cl_3 + O_3 + 2H_2O_2 \rightarrow 3HCl + 2CO_2 + H_2O + O_2$ | | |
|  | (1) | | |
|  | $2CO_2 + H_2O + O_2$ | | |
| MW | 131.4 | 48 | 34 |
| gms/hr (delivered) | 39.7 | 45 | 144 |
| Ratio (MW) | .3 | 93 | 4.2 (2 × 2.1) |
| Molecular ratio: | 1:2.7:14 | | |
| Weight ratio: | 1:1:4 | | |

The reaction of TCE to peroxide-coated ozone would yield very dilute chlorides, carbon dioxide, water, and dissolved oxygen (Equation 1). Initially, within the flow stream from the wellhead (175 gal/min), 45 gms of ozone and 144 gms of peroxide were injected. A ratio of 1:1:4 (by weight), 1:2.7:14 moles was originally tried and approximately matched.

Example

Bacteriocidal Action

A nano-bubble generator was set up on the National Sanitation Foundation (NSF) testing facility at the Massachusetts Military Reservation. The wastewater was directed through a sand filter leaching system and sent to a distribution box, at low flow, about 100 gpd. The nano-bubble laminar point was cylindrical 250 nm porous stainless steel. Ozone gas was delivered with a 4 gm/hr generator which received looped feedback of dehumidified gas from the top of the generator tube. Hydrogen peroxide was added to the laminar point at a rate of 4 gpd. The pulse time for injection of the bubble-laden liquid was varied from 5 to 18 minutes. Depending upon time from start of cycle, the ozone concentration varied from 500 ppmv to 5000 ppmv. The only liquid addition came from the peroxide which was varied from 8 to 15% solution. The liquid was continually stirred from the bottom of the bubble-generation chamber by a magnetically driven stirrer.

The nano-bubbles were generated by forcing the ozone gas through submicron-sized porous material containing spherical porous material under an oscillating (pulsed) liquid injection. In a pulsed framework entrapped gas bubbles will shear to sizes less than the pore neck. The positive outwards pressure of the gas and liquid carries the nano-bubbles out of the outer nano-porous cylinder which is subjected to a continuous shear surface with a rotating liquid. The water column containing the bubble density normally has a pressure of 20 to 50 psi (1.5 to 3.3 bar). The compressed micro-bubbles are not subjected to acoustic stimulation leading to violent adiabatic collapse nor does the process require a density gradient with salt water. With the use of ozone gas alone, surface tension change is sufficient to produce stable nano-bubbles.

Switching from water to hydroperoxide solutions, coats the surface of the nano-bubble, changing its reactive character and behavior. It is likely that the nano-bubble maintains its stability by balancing the collapsing force of water tension by dynamically absorbing dissolved gases and VOCs through Henry's forces and maintaining an equilibrium. The bubble stabilizes when the gas inflow matches the potential collapsing force of the water.

A series of tests were conducted on the wastewater flow to see the comparative rate of removal of fecal coliform with dissolved ozone, nano-bubble ozone (water solution, no peroxide), and ozone plus peroxide. FIG. 15 graphs the results of the tests. To obtain dissolved ozone, the ozone gas was sent through a sintered glass bubbler in a 500 cc solution containing the wastewater. The large (1-2 mm) gas bubbles were allowed to exit the water column for a period of 18 minutes, equivalent to the chamber generation time. In the B series tests, 5 ml of solution from the nano-bubble generator was added to 500 ml of wastewater solution. The sample at zero time had no solution added (Co). With others, samples were held and stirred on an oscillating tray for 3, 10, and 15 minutes. For peroxide addition, the input involved an 8% solution. At the end of the time period, the reactivity was terminated by thiosulfate addition. Samples were then placed under ice and transported to the County Public Health laboratory for immediate analysis.

Peroxide and nano-bubbles were the most effective in coliform removal. Nano-bubble ozone was next, followed by the dissolved ozone. Three log removal was observed in less than 4 minutes' exposure with a dilution of 1 to 100 in the domestic wastewater.

A number of embodiments of the invention have been described. Nevertheless, it will be understood that various modifications may be made without departing from the spirit and scope of the invention. Accordingly, other embodiments are within the scope of the following claims.

What is claimed is:

1. A generator device to produce a fluid stream comprising bubbles, the generator device comprising:
    a casing having an inlet port and an outlet port through which fluid would flow with the casing having a region that constricts fluid flow between the inlet port and the outlet port;
    a pair of feed ports that receive fluids, the pair of feed ports supported by the casing;
    a pair of microporous sleeve members disposed in a longitudinal relationship with the casing, and spaced from an inner surface of the casing, the pair of microporous sleeve members containing microporous media disposed within a space defined between the sleeve members, with at least one of the pair of feed ports that receive the fluid coupled to deliver the fluid through the microporous media.

2. The bubble generator of claim 1 wherein the casing is generally conical in shape and the pair of microporous sleeve members form a conical shape that generally follows the conical shape of the casing member.

3. The bubble generator of claim 1 wherein the casing comprises an inner first member that receives an inflow, the first member having a conical region, a neck-down region to constrict the inflow, and a cylindrical region and a second member comprising a conical member confining the pair of microporous sleeve members and connected to the conical region of the first member.

4. The bubble generator of claim 1 wherein the casing is generally cylindrical in shape and the pair of microporous sleeve members form a cylindrical shape that generally follows the cylindrical shape of the casing member.

5. The bubble generator of claim 1 wherein the casing comprises a first member that receives an inflow, the first member having a conical region, a neck-down region to constrict the inflow, and a cylindrical region, a first cylindrical member confining the pair of microporous sleeve members and a second cylindrical member connected to the first cylindrical member confining another pair of microporous sleeve members.

6. The bubble generator of claim 1 wherein the microporous media is comprised of glass beads.

7. The bubble generator of claim 1 wherein porosity of the sidewalls of the sleeve members is less than 0.5 microns.

8. The bubble generator of claim 1 wherein the microporous media has nano porosity.

9. The bubble generator of claim 1 further comprising a flange attached to the outlet port of the bubble generator.

10. The bubble generator of claim 1 further comprising a flange attached to the inlet port of the bubble generator.

11. The bubble generator of claim 1 wherein the casing comprises a first member that receives an inflow, the first member having a conical region and a neck-down region to constrict the inflow, and a cylindrical region; and
    a second conical member confining the pair of microporous sleeve members and which is in fluid communication with the cylindrical region.

12. The bubble generator of claim 11 wherein a gap exists between the first member and the second conical member.

13. The bubble generator of claim 1 wherein the casing is comprised of a solid material selected from the group consisting of a ceramic, stainless steel, sintered glass, PVDF and a HDPE plastic.

14. The bubble generator of claim 1 wherein the generator in operation produces nano-size bubbles.

15. The bubble generator of claim 1 wherein porosity of the sidewalls of the sleeve members is less than 0.5 microns.

16. An arrangement comprising:
    a generator device to produce a fluid stream comprising bubbles, the generator device comprising:
        a casing having an inlet port and an outlet port through which a fluid stream of frac-water comprising contaminates flows with the casing having a region that constricts fluid flow between the inlet port and the outlet port;
        a pair of feed ports that receive fluids supported by the casing;
        a pair of microporous sleeve members disposed in a longitudinal relationship with the casing, and spaced from an inner surface of the casing, the pair of microporous sleeve members containing microporous media disposed within a space defined between the sleeve members, with at least one of the pair of feed ports that receive the fluid coupled to deliver the fluid through the microporous media; and
    a vessel that receives treated frac-water, the vessel fed by a stream of carbon dioxide to precipitate out alkaline earth metals present in the treated frac-water.

17. The arrangement of claim 16 wherein the vessel is a first vessel and the arrangement further comprises:
    a second vessel coupled to the generator, the second vessel having a first inlet that is coupled via a fluid line to the outlet of the casing of the generator, a first outlet, a second inlet to receive frac-water, and a second outlet;
    a pump coupled to the first outlet of the second vessel to receive water from the second vessel and to pump the received water into the inlet port of the casing of the bubble generator device.

18. The arrangement of claim 17 further comprising:
    apparatus for feeding carbon dioxide to the second vessel from a source of carbon dioxide and for feeding carbon dioxide generated from reactions involving the water in the first vessel.

19. The arrangement of claim 16 wherein the casing is generally conical in shape and the pair of microporous sleeve members form a conical shape that generally follows the conical shape of the casing member.

20. The arrangement of claim 16 wherein the casing is generally cylindrical in shape and the pair of microporous sleeve members form a cylindrical shape that generally follows the cylindrical shape of the casing member.

21. The bubble generator of claim 16 wherein the generator device comprises microporous media that is comprised of glass beads.

22. The bubble generator of claim 16 wherein the generator device comprises microporous media that is comprised of glass beads and the porosity of the sidewalls of the microporous sleeve members is less than 0.5 microns.

23. A generator device to produce a fluid stream comprising bubbles, the generator device comprising:
    a casing having an inlet port and an outlet port through which fluid would flow with the casing having a region that constricts fluid flow between the inlet port and the outlet port, with the casing generally conical in shape;
    a pair of feed ports that receive fluids, the pair of feed ports supported by the casing;

a pair of microporous sleeve members disposed in a longitudinal relationship with the casing, and spaced from an inner surface of the casing, the pair of microporous sleeve members containing microporous media disposed within a space defined between the sleeve members, with at least one of the pair of feed ports that receive the fluid coupled to deliver the fluid through the microporous media.

24. The generator device of claim 23 wherein the pair of microporous sleeve members form a conical shape that generally follows the conical shape of the casing member, and wherein the generator device further comprises first and second flange members attached respectively to the inlet and outlet ports.

25. A generator device to produce a fluid stream comprising bubbles, the generator device comprising:
  a casing having an inlet port and an outlet port through which fluid would flow with the casing having a region that constricts fluid flow between the inlet port and the outlet port, with the casing generally cylindrical in shape, with a first portion of the casing having a first diameter and a second portion of the casing having a second, larger diameter;
  a pair of feed ports that receive fluids, the pair of feed ports supported by the casing;
  a pair of microporous sleeve members disposed in a longitudinal relationship with each of the first and second portions of the casing, and spaced from an inner surface of the casing, the pair of microporous sleeve members containing microporous media disposed within a space defined between the sleeve members, with at least one of the pair of feed ports that receive the fluid coupled to deliver the fluid through the microporous media.

26. The generator device of claim 25 wherein the casing is generally cylindrical in shape and the pair of microporous sleeve members form a cylindrical shape that generally follows the cylindrical shape of the casing member, and wherein the generator device further comprises first and second flange members attached respectively to the inlet and outlet ports.

* * * * *